United States Patent
Bullington et al.

(10) Patent No.: US 10,710,378 B1
(45) Date of Patent: Jul. 14, 2020

(54) PRINTING SYSTEM FOR APPLYING IMAGES OVER A CONTOURED AXIALLY SYMMETRIC OBJECT

(71) Applicant: LSINC Corporation, Huntsville, AL (US)

(72) Inventors: James Richard Bullington, Athens, AL (US); Christopher Shea Curry, Fayetteville, TN (US)

(73) Assignee: LSINC Corporation, Huntsville, AL (US)

( * ) Notice: Subject to any disclaimer, the term of this patent is extended or adjusted under 35 U.S.C. 154(b) by 0 days.

(21) Appl. No.: 16/526,604

(22) Filed: Jul. 30, 2019

Related U.S. Application Data

(60) Provisional application No. 62/830,864, filed on Apr. 8, 2019.

(51) Int. Cl.
*B41J 29/38* (2006.01)
*B41J 3/407* (2006.01)
*G06F 3/12* (2006.01)

(52) U.S. Cl.
CPC .......... *B41J 3/4073* (2013.01); *G06F 3/1237* (2013.01)

(58) Field of Classification Search
CPC .................................. B41J 29/02; B41F 17/00
See application file for complete search history.

(56) References Cited

U.S. PATENT DOCUMENTS

| | | | |
|---|---|---|---|
| 8,926,047 B2* | 1/2015 | LaCaze | B41J 2/1752 347/16 |
| 9,327,492 B2* | 5/2016 | Knott | B41F 17/00 |
| 2006/0203024 A1 | 9/2006 | Kusunoki | |
| 2010/0064912 A1 | 3/2010 | Martinez | |
| 2016/0028907 A1* | 1/2016 | Kato | G06F 3/04845 358/1.13 |
| 2018/0250883 A1 | 9/2018 | Nagahari et al. | |

FOREIGN PATENT DOCUMENTS

WO  WO 2019/178592  9/2019

\* cited by examiner

*Primary Examiner* — Lam S Nguyen
(74) *Attorney, Agent, or Firm* — The Gache Law Firm, P.C.; Russell C. Gache

(57) ABSTRACT

A printing system applies images on the exterior of an axially symmetrical object that has a varying exterior surface, such as occurs on curved wine bottles and sports equipment like bats. The printing system includes a movable carriage having rotatable locking end members for holding the object for printing stationary along its longitudinal axis, but allowing for controlled rotation of the object. The carriage moves the object from a loading area into a printing area and a plurality of movable printing head assemblies position a plurality of ink jet heads over the surface of the object as it is moved along a linear axis under the print head assemblies. Each print head is movable such that as the object moves underneath the print head tilts to match the local slope of the contoured surface as ink is being applied. The applied image is then cured with UV lamps during rotation.

22 Claims, 16 Drawing Sheets

| | A | B | C | D | E | F |
|---|---|---|---|---|---|---|
| | CAD CURVE DATA | CAD CURVE SLOPE | RATE OF CHANGE OF SLOPE | OFFSET PRINT HEAD CURVE Z_1 | z_1 VELOCITY | OFFSET CURVE Z_1 TILT |
| 1 | 26.0000 | 0 | -0.001666671 | 27.5000 | -0.0001 | 27.5000 |
| | 26.0000 | -0.001666671 | -0.003333398 | 27.5000 | -0.1199 | 27.5427 |
| | 25.99833333 | -0.005000069 | -0.003333565 | 27.4983 | -0.3586 | 27.6264 |
| | 25.99333326 | -0.008333634 | -0.003333843 | 27.4933 | -0.5973 | 27.7067 |
| | 25.98499962 | -0.011667477 | -0.003334232 | 27.4849 | -0.8361 | 27.7837 |
| | 25.97333215 | -0.015001709 | -0.003334732 | 27.4732 | -1.0748 | 27.8574 |
| | 25.95833044 | -0.018336441 | -0.003335344 | 27.4581 | -1.3136 | 27.9275 |
| | 25.939994 | -0.021671784 | -0.003336067 | 27.4396 | -1.5524 | 27.9940 |
| | 25.91832221 | -0.025007851 | -0.003336901 | 27.4179 | -1.7913 | 28.0571 |
| | 25.89331436 | -0.028344752 | -0.003337848 | 27.3927 | -2.0303 | 28.1169 |
| | 25.86496961 | -0.0316826 | -0.003338906 | 27.3642 | -2.2693 | 28.1733 |
| | 25.83328701 | -0.035021506 | -0.003340076 | 27.3324 | -2.5084 | 28.2265 |
| | 25.79826551 | -0.038361582 | -0.003341359 | 27.2972 | -2.7475 | 28.2757 |
| | 25.75990392 | -0.041702941 | -0.003342754 | 27.2586 | -2.9868 | 28.3216 |
| | 25.71820098 | -0.045045695 | -0.003344261 | 27.2167 | -3.2261 | 28.3641 |
| | 25.67315529 | -0.048389956 | -0.003345882 | 27.1714 | -3.4656 | 28.4034 |
| | 25.62476533 | -0.051735838 | -0.003347616 | 27.1228 | -3.7052 | 28.4393 |
| 222 | 25.57302949 | -0.055083454 | -0.003349463 | 27.0708 | -3.9449 | 28.4718 |
| | ⋮ | ⋮ | ⋮ | ⋮ | ⋮ | ⋮ |
| | 32.06905065 | -0.029012217 | 0.002002356 | 33.5684 | -2.0611 | 34.3096 |
| | 32.04003843 | -0.02700986 | 0.002002032 | 33.5395 | -1.9189 | 34.2297 |
| | 32.01302857 | -0.025007829 | 0.002001731 | 33.5126 | -1.7767 | 34.1518 |
| | 31.98802074 | -0.023006097 | 0.002001455 | 33.4876 | -1.6345 | 34.0759 |
| | 31.96501464 | -0.021004643 | 0.002001203 | 33.4647 | -1.4923 | 34.0021 |
| | 31.94401 | -0.01900344 | 0.002000974 | 33.4437 | -1.3501 | 33.9302 |
| | 31.92500656 | -0.017002466 | 0.00200077 | 33.4248 | -1.2080 | 33.8602 |
| | 31.9080041 | -0.015001695 | 0.00200059 | 33.4078 | -1.0659 | 33.7920 |
| | 31.8930024 | -0.013001105 | 0.002000434 | 33.3929 | -0.9238 | 33.7258 |
| | 31.8800013 | -0.011000671 | 0.002000302 | 33.3799 | -0.7817 | 33.6616 |
| | 31.86900063 | -0.009000369 | 0.002000194 | 33.3689 | -0.6396 | 33.5994 |
| | 31.86000026 | -0.007000175 | 0.00200011 | 33.3600 | -0.4975 | 33.5392 |
| | 31.85300008 | -0.005000065 | 0.00200005 | 33.3530 | -0.3554 | 33.4810 |
| | 31.84800002 | -0.003000015 | 0.002000014 | 33.3480 | -0.2133 | 33.4248 |
| | 31.845 | -0.001000001 | 0.001000001 | 33.3450 | -0.0712 | 33.3706 |
| n | 31.844 | 0 | 0 | 33.3440 | 0.0000 | 33.3440 |

| G | H | I | J | K |
|---|---|---|---|---|
| Z_1 TILT VELOCITY | INCREMENTAL HORIZONTAL SHIFT ALONG PRINTED PATH | CUMMULATIVE Dx SHIFT DUE TO CURVE LENGTH ON PRINTED PATH | Dx SHIFT WITH OFFSET CORRECTION VALUE | LAMP PATH |
| 3.0412 | 0.00000000 | 0.00000000 | 0.00000000 | 26 |
| 5.9628 | 0.00000139 | 0.00000139 | -0.00249861 | 26 |
| 5.7244 | 0.00001250 | 0.00001389 | -0.00748612 | 26 |
| 5.4862 | 0.00003472 | 0.00004861 | -0.01245140 | 26 |
| 5.2482 | 0.00006806 | 0.00011668 | -0.01738335 | 26 |
| 5.0002 | 0.00011252 | 0.00022920 | -0.02227084 | 26 |
| 4.7344 | 0.00016810 | 0.00039729 | -0.02710274 | 26 |
| 4.4969 | 0.00023481 | 0.00063210 | -0.03186795 | 26 |
| 4.2595 | 0.00031265 | 0.00094475 | -0.03655531 | 26 |
| 4.0223 | 0.00040163 | 0.00134638 | -0.04115368 | 26 |
| 3.7839 | 0.00050177 | 0.00184815 | -0.04565192 | 26 |
| 3.5063 | 0.00061307 | 0.00246121 | -0.05003886 | 26 |
| 3.2694 | 0.00073553 | 0.00319675 | -0.05430333 | 26 |
| 3.0327 | 0.00086919 | 0.00406594 | -0.05843415 | 26 |
| 2.7960 | 0.00101404 | 0.00507998 | -0.06242011 | 26 |
| 2.5595 | 0.00117011 | 0.00625009 | -0.06625001 | 26 |
| 2.3142 | 0.00133740 | 0.00758749 | -0.06991262 | 26 |
| 2.0756 | 0.00151594 | 0.00910344 | -0.07339668 | 26 |
| ⋮ | ⋮ | ⋮ | ⋮ | ⋮ |
| -5.6920 | 0.00042077 | 1.05599866 | 1.01249864 | 33.5 |
| -5.5492 | 0.00036470 | 1.05636336 | 1.01586334 | 33.5 |
| -5.4064 | 0.00031265 | 1.05667601 | 1.01917599 | 33.5 |
| -5.2637 | 0.00026461 | 1.05694061 | 1.02244059 | 33.5 |
| -5.1211 | 0.00022057 | 1.05716119 | 1.02566117 | 33.5 |
| -4.9837 | 0.00018055 | 1.05734173 | 1.02884172 | 33.5 |
| -4.8590 | 0.00014453 | 1.05748627 | 1.03198625 | 33.5 |
| -4.7165 | 0.00011252 | 1.05759878 | 1.03509877 | 33.5 |
| -4.5741 | 0.00008451 | 1.05768330 | 1.03818329 | 33.5 |
| -4.4318 | 0.00006051 | 1.05774380 | 1.04124379 | 33.5 |
| -4.2895 | 0.00004050 | 1.05778430 | 1.04428430 | 33.5 |
| -4.1472 | 0.00002450 | 1.05780880 | 1.04730880 | 33.5 |
| -4.0050 | 0.00001250 | 1.05782131 | 1.05032130 | 33.5 |
| -3.8629 | 0.00000450 | 1.05782581 | 1.05332580 | 33.5 |
| -1.8960 | 0.00000050 | 1.05782631 | 1.05632630 | 33.5 |
| 0.0000 | 0.00000000 | 0.77772095 | 0.77772095 | 33.5 |

FIG. 14B

PRINTING SYSTEM FOR APPLYING IMAGES OVER A CONTOURED AXIALLY SYMMETRIC OBJECT

This application claims the benefit of filing priority under 35 U.S.C. § 119 and 37 C.F.R. § 1.78 of the U.S. provisional Application Ser. No. 62/830,864 filed Apr. 8, 2019, for a Printing System for Applying Images Over a Contoured Axially Symmetric Object. All information disclosed in that prior pending nonprovisional application is hereby incorporated by reference.

FIELD OF THE INVENTION

The present invention relates generally to printing of images on articles of manufacture. In greater particularity, the present invention relates to printing images on the exterior of axially symmetrical articles of manufacture using inkjet printing technology. The invention also relates to direct printing on cylindrical objects while the objects are axially rotated, and to some degree "direct-to-shape" printing or DTS for 3-dimensional objects.

BACKGROUND OF THE INVENTION

Several techniques are utilized to print images on manufactured goods, such as drink and cosmetics containers. These containers are made of various materials, such as plastics, metals, and coated paper, and the traditional method for placing images on these containers, sometimes called "imaging" a container, is to print a label on a plastic or paper substrate and then affix the pre-printed label onto the container with adhesive. However, during the last 20 years many manufactures have transitioned from label printing to direct printing onto the container surface, sometime referred to as "direct-to-shape" (DTS) printing. However, while a label is a flexible medium and may be printed using traditional flexible sheet printing using methods going back over 100 years, direct printing on containers poses many challenges. One challenge is that while paper readily absorbs and retains inks and is a well understood medium for imaging, the containers themselves are made of materials that are difficult to image. Inks of special chemical blends and additives must be used, sometimes in the presence of active drying or hardening processes such as catalyst exposure or fast-curing using ultra-violet (UV) radiation. Further, container shapes are fixed, and an imaging process must take into account the irregular and varied shapes of the containers that are to be imaged. Such challenging print surfaces comprise a good-many products, such as drink cans and bottles, home care products, cups, coffee tumblers, personal care items, automotive parts, sports equipment, medical products, and electronics containers to name just a few. Hence, choosing the proper type of DTS printing equipment largely depends on the shape, size, number of colors, and type of substrate to be imaged, as well as the method that is preferred in which to transfer the image onto the substrate surface.

Various techniques have been developed to achieve DTS printing. One technique, "pad printing," allows the transfer of a two-dimensional image onto a three-dimensional surface through the use of a silicone pad, an ink cup, and an etched plate. Pad printing is ideal for difficult substrates such as products found in the medical field and promotional printing, but due to the expense of the process pad printing typically uses only 1 or 2 colors during a print job.

Another technique, screen printing utilizes a mesh or screen to transfer the ink to the substrate surface. The process requires creating a screen that selectively permits ink to flow through the screen using a blocking stencil. While a photographic process may be used to create a screen, and hence allows relatively good resolution of imaging, the process requires substantial set-up time and is less flexible because any update or small alteration to the image to be laid down requires the creation of a new screen set. In addition, screen printing is typically restricted to only 1 or 2 colors because each color requires its own separate customized screen.

Inkjet DTS printing has over time risen to be a preferred method for DTS printing, especially for package printing. Inkjet printing utilizes a digital printhead to print full color customized designs in one or multiple imaging passes and may be applied directly to the substrate surface of the object or medium. Developed in the 1970s, inkjet printers were created to reproduce a digital image on a printing surface. The transfer occurs by propelling droplets of ink directly onto the substrate medium. The ink delivery mechanism is called the "printhead," and is controlled by a digital image held by a connected computer system and which may be altered an infinite number of times. However, the design of printheads in an inkjet system varies greatly. Each head is uniquely designed for its application, and a variety of digital printers designs are available to be used to print on various substrates. Hence, various factors drive the types of inkjet printing system to be utilized for a printing project, such as the type of product substrate to be printed, the volume of products to be printed, and the required manufacturing speed for the imaging of any product traversing through the manufacturing line.

However, the benefits of inkjet printing in DTS applications have driven a recent preference to use inkjet systems in product manufacturing lines. For example, inkjet printing requires less set-up time and allows for faster print and cure times. Inkjet printing also is configurable to allow printing on multiple items at once, whereas other printing methods are often restricted to a single print instance for each object being printed. Moreover, print jobs do not require fixed setup time and costs, such as the generation of screens or the installation of plates.

On great advantage of inkjet printing is the ability to change graphic images quickly, sometimes almost in real-time, to adjust for printing results. Modern imaging software is template driven and allows for the importation of new or re-worked graphics instantly. Hence, the flexibility of image alteration on a job-by-job basis is a distinct advantage.

In addition, inkjet printers are robust enough to be used for short and long printing production projects, thereby meeting various manufacturing demands. For example, single machine may be used to prototype or provide a sample, low-volume job for a potential client, or that same machine may be used in the same facility to print thousands of articles in a day. Further, the same machine may use various types of inks to accommodate different object substrate materials.

Finally, conveyor and assembly line capability allow the inkjet printing process to become automated which can increase productivity and lower labor costs. So-called "inline" printers can do such printing at incredibly fast production rates. Typically, the inkjet printhead remains stationary while the substrate is moved past the printhead. This type of inkjet system is ideal for barcoding and dating product packaging. Single-pass multi-color inkjet printers are similar sometimes offering higher quality imaging with more color options at slightly slower print speeds.

One type of inkjet system is specialized to print on the surface of cylindrical containers and are called "digital cylindrical presses." For example, The INX Group Ltd. (aka "Inx Digital" and "JetINX") a division of Sakata INX offers a cylindrical printing solution under its CP100 and CP800 line of direct-to-shape (i.e. DTS) inkjet printing systems. These systems allow for the creation of an inkjet production line to print directly onto axially symmetrical objects. Other companies offer similar systems, such as Inkcups Now Corporation which offers the Helix line of DTS printers. These printers use a rotatable mandrel to hold an object and rotate the object next to an inkjet printhead as the printhead jets ink onto the surface of the cylindrical object. An image is captured for transfer onto an object and a printing "recipe" created, either by the printing machine itself or separately on personal computer and then imported into the printing machine. The "recipe" includes information necessary for the printing an image onto a media object and the recipe parameters are specific to each type of printer utilized.

The CP100 machine is a good example of an industry standard cylindrical DTS printing system. The system is a stand-alone machine that performs non-contact printing of images on generally cylindrical objects, particularly hollow cylindrical objects or hollow partially-cylindrical objects, for example, cans and bottles and including two-piece cans and bottles. Each cylindrical object is hand-loaded onto the machine and secured by vacuum on a mandrel to prevent slippage, which is part of a carriage assembly that functions to linearly positioning the object beneath at least one digitally controlled inkjet printhead. The object is rotated in front of the printhead while ink is deposited to the object to produce a desired printed design on the object. The ink is either partially or fully cured immediately after printing by exposing the ink to an energy-emitting means, such as a UV light emitter, positioned directly beneath the object. A carriage assembly is fixedly mounted to a linear slide actuator, which is in turn fixedly mounted to a mounting frame, whereby the carriage assembly is free to traverse along the linear slide actuator. The carriage linearly advances the object in a position adjacent to the inkjet printhead such that a first portion of the object may be printed if the object length is longer than the length of the printhead. The object is rotated while the computer-controlled printheads deposit ink from a supply of ink located above the object being printed upon. Simultaneously the UV light emitter either partially or completely cures the ink. The carriage then continues to advance the can further such that the entire length of the can is printed. As may be understood, the continuous advancement of the object by the printhead may not be necessary if the printhead is longer than the image desired to be printed on the object. The image itself comprises a digital image that is imported from a separate imaging application and loaded into application that creates a "recipe" of the image based on the physical specifications of the object to be printed upon. The profile is loaded through an operating system present on the machine and utilized to control motion of the object held by the carriage assembly along the linear slide. A print engine running on the machine controls the delivery of ink onto the object via the inkjet printhead as the object is moved past the printhead in a digitally controlled manner. The precise deposition of the ink via the inkjet heads onto the object, is dependent upon the object recipe which includes the specific amount and color of ink applied to the object as it traverses the printhead. The structure and operation of standard cylindrical DTS printing systems are fairly well understood in the printing industry and disclosed in representative U.S. Pat. Nos. 6,918,641B2 and 7,967,405B2.

However, the machines offered by Inx International only print onto a cylindrically flat exteriors and do not allow for the printing over curved exteriors of axially symmetric objects, such as exists on tapered drink tumblers or 3-dimensionally contoured bottle shapes.

The above-mentioned Helix line of cylindrical printers offered by Inkcups does allow for DTS printing of axially symmetrical, tapered drinkware, such as common stainless-steel drink tumblers. The Helix printer achieves this by tilting a mandrel holding the object to be printed and adjusting the angle of the object relative to a stationary printhead to approximate a straight line over a contoured surface of the object. The problem with the Helix approach is that such straight-line approximation does not ensure a constant density of ink to be applied to the object because the print head moves outside of an optimal jetting distance due to the fixed length of the print head. This non-optimal positioning of the object in relation to the printhead results in unacceptable color shifts in the printed image and various image issues due to increased ink drop drift and overspray. Since these types of cylindrical printers cannot provide constant articulation of the head or media throughout the print cycle to minimize the jetting distance, the Helix and similar printers are limited to printing on axis symmetrical shapes that are approximately cylindrical or conical where the gap between the printhead and printed surface can be maintained at a distance that does not exceed the capability of the printhead to provide acceptable dot placement and image quality. Hence, these types of printers are limited in the types media on which they may print because most contoured media objects will exceed the printhead capabilities of these printers (e.g. greater than 5 mm jetting distances), thereby not being able to produce a quality image.

Therefore, which is needed is a system that allows for inkjet printing along a 3-dimensionally contoured surface of an object during direct-to-shape or DTS imaging that provides superior color imaging over a contoured surface where approximating the shape as a cylinder or cone does not provide acceptable image quality due to the printhead being too far away from the continually varying printed surface.

SUMMARY OF THE INVENTION

It is the object of the present invention to provide a printing system and method for applying images on the exterior of an axially symmetrical object that has a varying exterior surface, such as occurs on curved wine bottles and sports equipment like bats. The printing system includes a movable carriage having rotatable locking end members for holding the object for printing stationary along its longitudinal axis, but allowing for controlled rotation of the object. The carriage moves the object from a loading area into a printing area and a plurality of movable printing head assemblies positions a plurality of ink jet heads over the surface of the object as it is moved along a linear axis under the print head assemblies. Each print head is movable such that as the object moves under each head the print head tilts to match to local slope of the contoured surface underneath the ink jetting nozzles. A bank of curing lights is positioned underneath the object so that as it rotates ink applied by the printing heads to the surface of the object is cured during rotation of the object. Each object that is to be imaged has its own separate image profile to provide parameter inputs to the machine to control the movement of the object and ink head assemblies for each print job.

Other features and objects and advantages of the present invention will become apparent from a reading of the following description as well as a study of the appended drawings.

BRIEF DESCRIPTION OF THE DRAWINGS

A printing system incorporating the features of the invention is depicted in the attached drawings which form a portion of the disclosure and wherein.

DESCRIPTION OF THE PREFERRED EMBODIMENTS

Figure 1:
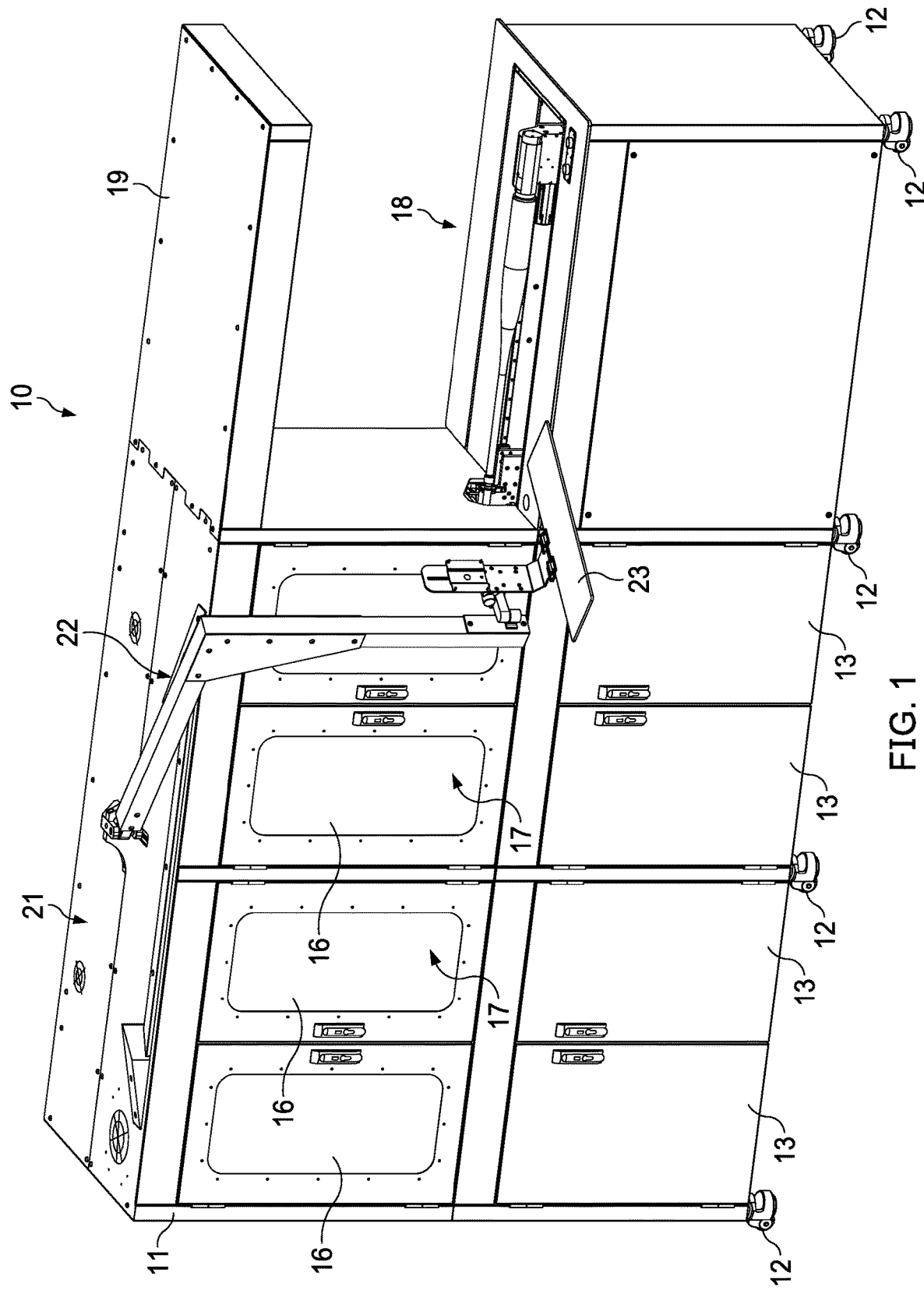
FIG. 1 is a front perspective view of the printing system showing the major elements of the machine.

Referring to the drawings for a better understanding of the function and structure of the invention, FIG. 1 shows a front view of the machine 10 showing the primary external components of the invention. Machine 10 includes an external frame 11 and a series of adjustable rollers 12 supporting the machine components. Multiple panel doors 13 provide areas for storage of printer supplies, such as large volume ink reservoirs, and for cable conduit distribution for internal communications and power lines to power the machine 10. A pair of accordion doors 16 having viewing windows as shown to provide for the isolation of moving parts during the printing process for safety reasons, while allowing viewing of images being applied to various types of media within the interior printing area 17. Frame 11 also supports a top panel 21 having multiple fans with exterior grills for exhausting of heated air within the machine and any chemical fumes created during the imaging and curing process. A hood 19 supported by frame 11 and connected with top panel 21 extends to the right of the machine 10 over a media fixing area 18. An articulated support arm assembly 22 is connected to top panel 21 and allows for an operator to place a laptop or other compatible personal computing device on a platform landing area 23 of the arm to facilitate communication and control of the machine if needed. Landing area 23 can also hold a display device and keyboard for communicating with a Windows PC held behind panels 13 that controls printer 10.

System 10 incorporates several purchased subsystems that include integration modifications to make system 10 operative. For example, system 10 includes an ink delivery system manufactured by INX Group Ltd. (aka JetINX) that includes a system of pumps, electronic controls (i.e. a print engine), and a tubing system to transport inks of various colors from reservoirs inside a user accessible lower portion in the rear of the system 10 to a plurality of ink tanks and thereafter to a bank of inkjet print heads, as will be further described. The INX print engine includes its own human machine interface (HMI) that runs on a standard Windows based PC and that controls the operation of the print engine. Some variations of the INX HMI include the capability to vary ink pressures delivered to each inkjet head by sending messages to the INX HMI through a dynamic linked library (.DLL) file loaded onto the PC. In the preferred embodiment of the herein described printing system 10, a second HMI (referred to herein as the "LSINC HMI") overlays the INX HMI to extend the interface capabilities of the INX HMI such the herein described system may utilize the INX supplied sub-systems. In particular, the LSINC HMI responsive to a supplied media object geometry file converts those media geometries into a form usable by a motion control subsystem and using those geometries transfers ink pressure changes to the INX HMI to adjust for inkjet print head movements, as will be further discussed. Further, as is known in the industry, inks are selected specifically to bond with and adhere to the surface of various types of media object surfaces in order to accommodate the graphical color requirements of each graphic design used in a print job. The complexities of selecting inks and color coordination to achieve a particular graphic design goal, and the elements for and the operation of the purchased INX ink delivery system will be omitted in as much as such information is understood in the industry and not necessary for a complete understanding of the herein described invention.

Figure 2A:
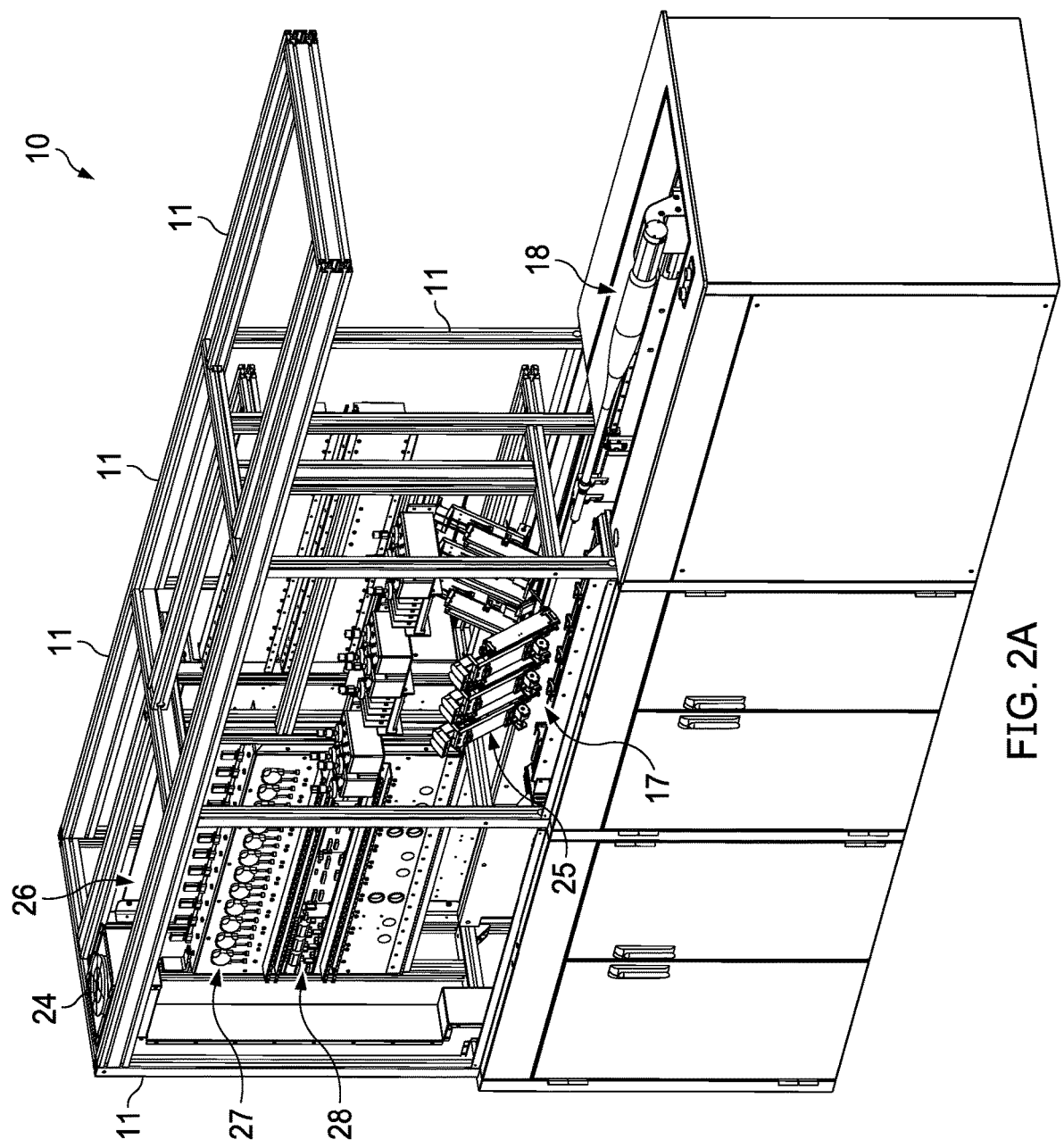
FIG. 2A is a perspective view of the printing system having the exterior enclosure panels removed to show the internal operative components.
Figure 2B:
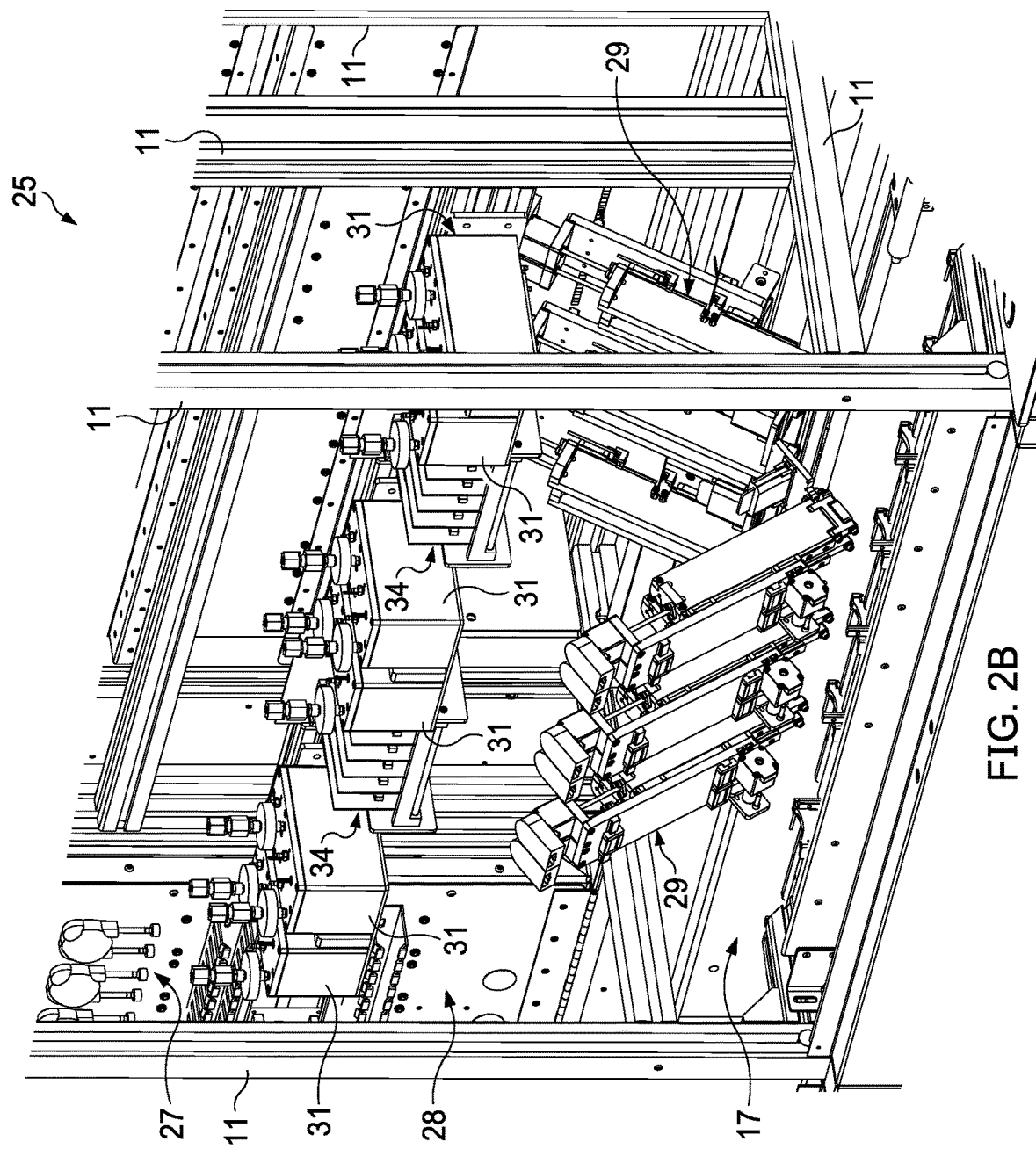
FIG. 2B is a magnified perspective view of the printing area of the printing system.
Figure 3:
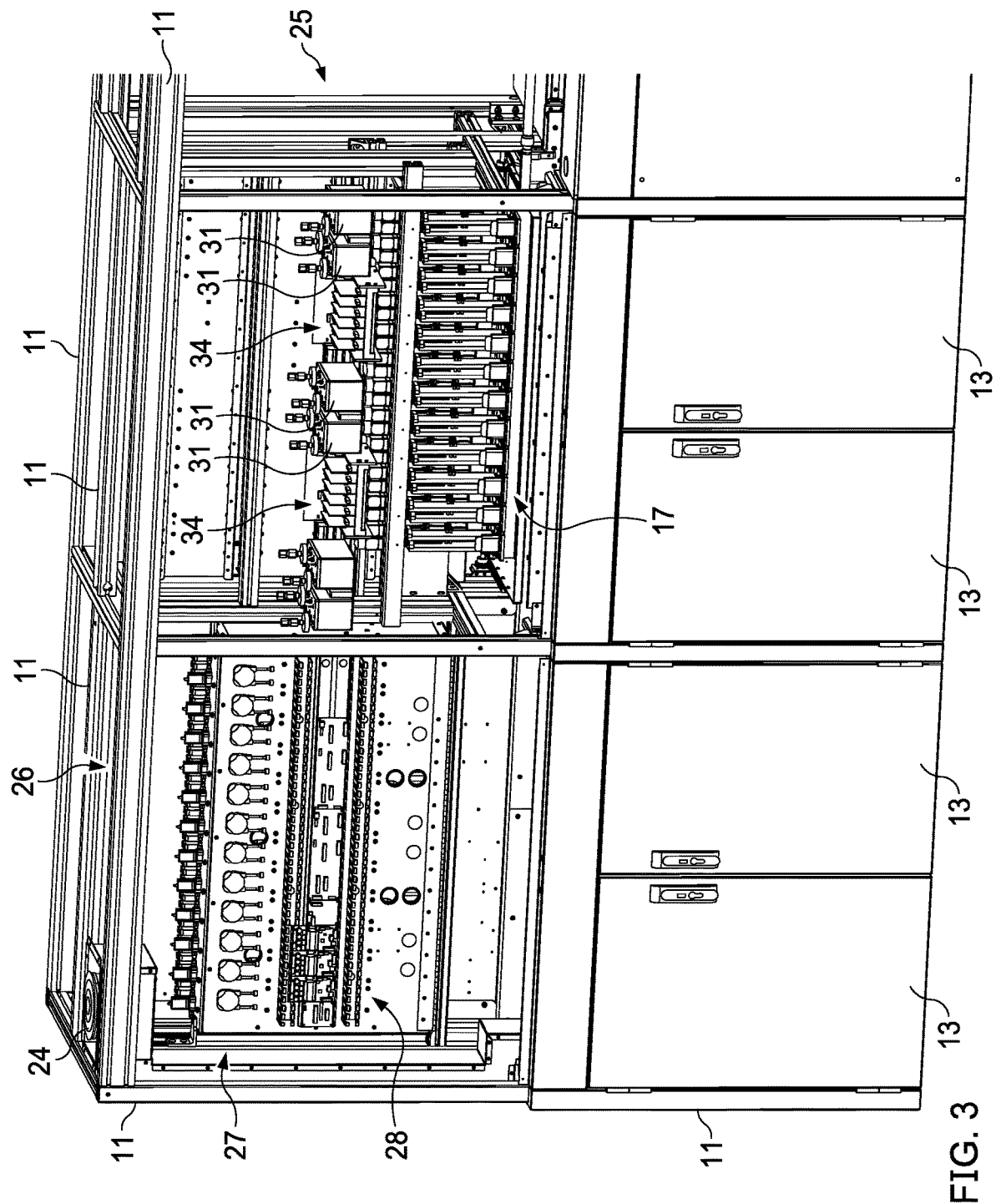
FIG. 3 is a front side elevational view of the printing system.

FIGS. 2A-2B and FIG. 3 show the machine internal components including an exhaust fan 24 supported by frame 11 and protruding through panel 21, a printing assembly area 25 within printing area 17 supported by internal frame components 11 and positioned above and surrounding a space into which media is positioned for imaging. To the left of the printing assembly area 25 is positioned a collection of peristaltic pumps in a single assembly 27 supported above an electronics bay 28 holding various electronics and printed circuit boards (PCBs) for controlling the machine and printing process. The left side 26 of machine 10 houses the pumps and electronics bay and is accessible from both the front and back of machine 10. Exhaust fan 24 removes waste heat from area 26 to keep a constant flow of cooler air flowing across individual components.

FIGS. 2B-3 show the individual component assemblies in interior printing area 17 from FIG. 1. Printing assembly area 25 includes banks of ink head assemblies 29 supported above printing area 17, and a linear grouping of ink curing lamps 32 are positioned along a lower portion of printing area 17 for curing of inked images. Positioned above assemblies 29 are multiple ink supply tanks 31 feeding each ink head assembly via tubing (not shown). Adjacent to each tank is a control board 34 for controlling the operation of each printing head manipulator assembly in the bank 29.

Figure 4:
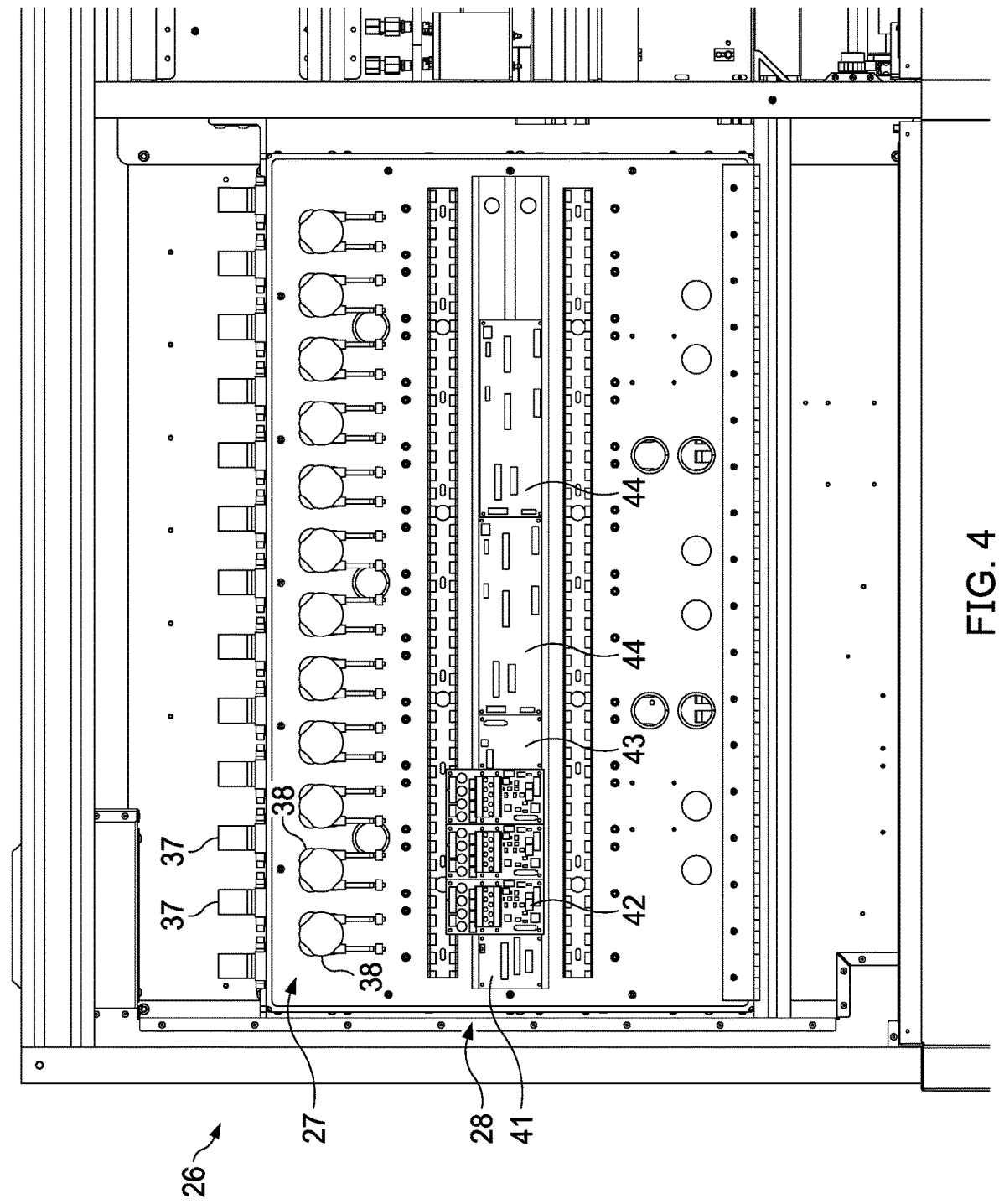
FIG. 4 is a magnified view of the front left portion of the printing system.

From the front side of bay 26 may be more clearly seen per FIG. 4 the series of peristaltic pumps 38 above several PCBs. Electronics bay 28 includes an encoder I/O board 41, a vacuum control board 42 for controlling the pressure of ink flowing from each pump 38 to ink head assemblies 29, and a USB controller board 43 adjacent to two consolidated I/O boards 44.

Figure 5:
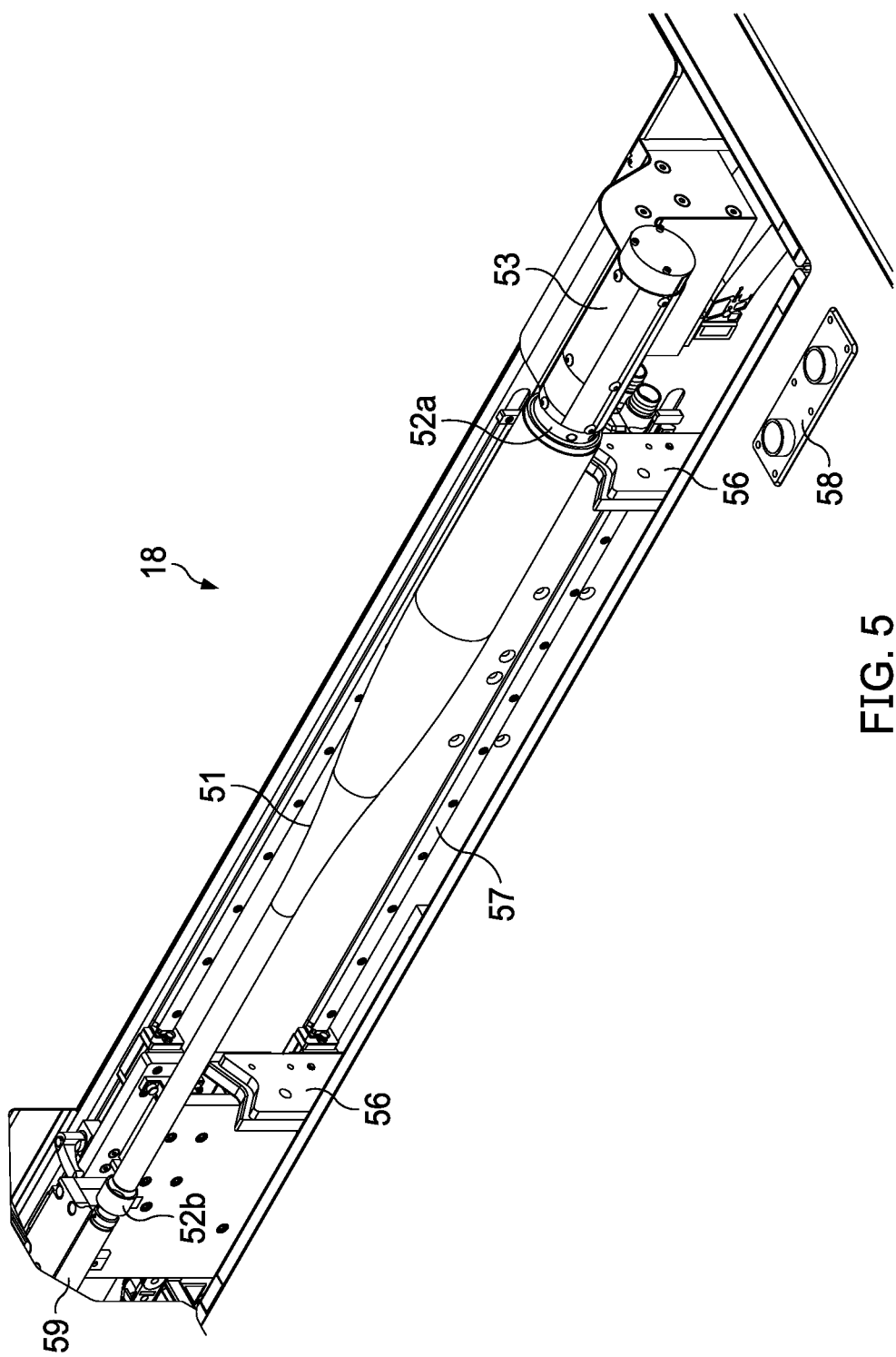
FIG. 5 is a detail view of the carriage mounting assembly of the printing system shown in FIG. 1.
Figure 6:
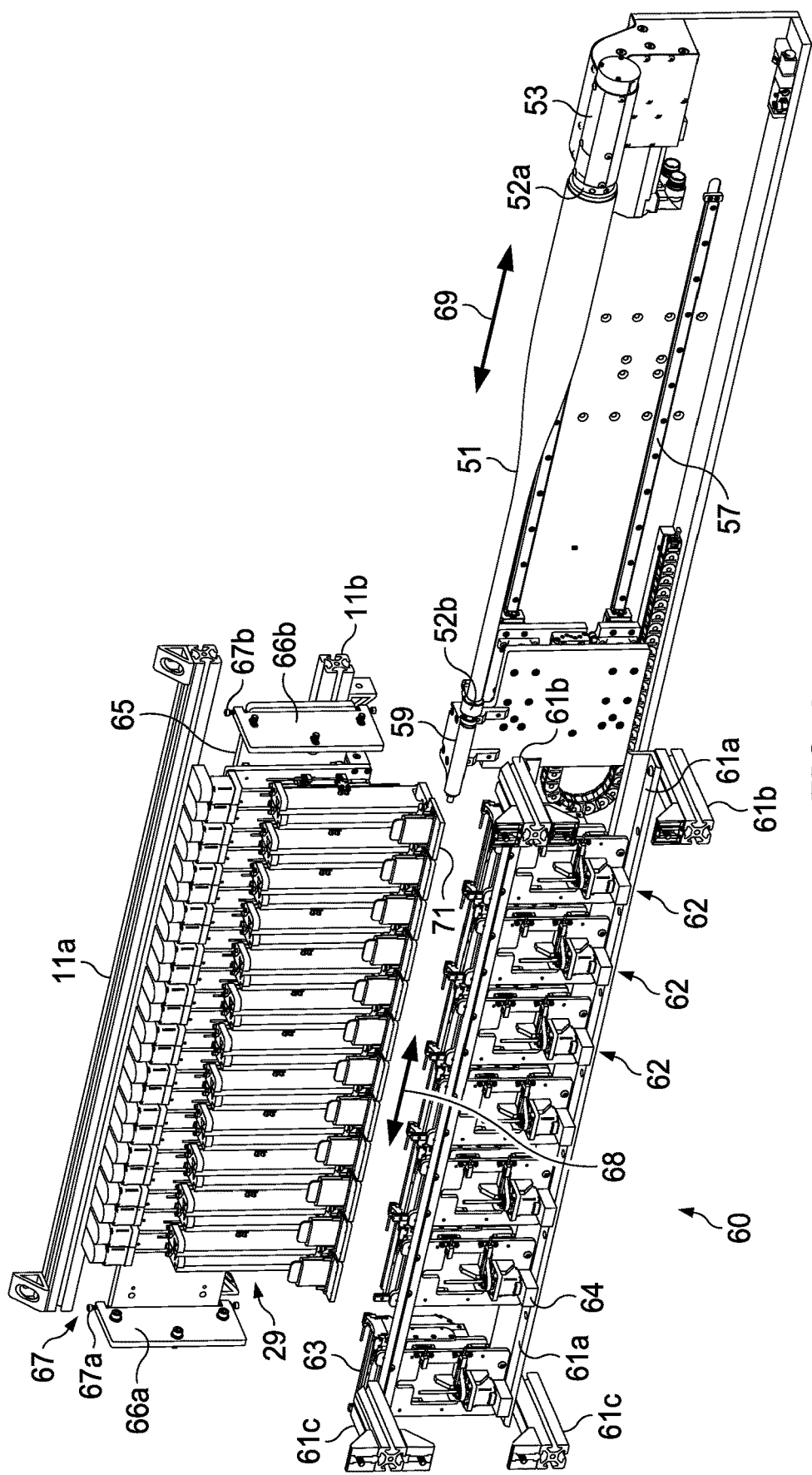
FIG. 6 is a major subassembly perspective view of the printing area of the printing system.

Referring now to FIGS. 5 and 6 it may be seen an arrangement of elements that causes a printable media object 51 to be secured and moved into the imaging area 17 from media loading area 18 responsive to electronic control elements held in bay 26. Initially a piece of media, such as an object having an axially symmetrical surface area, is clamped at its ends between two clamping fixtures 52a,b with the help of a media support member 56. Clamping fixtures 52a,b form a rotatable mandrel holding object 51 rotatable via internal bearings at each end which allow media 51 to freely rotate about its longitudinal central axis via rotary servo 53 causing axial rotation responsive to inputs received from electronics held in bay 26. In this arrangement, object 51 along with clamps 52a,b effectively becomes a spindle the surface of which becomes a printable surface during rotation. A carriage 57 supports the servo motor, media, and the spindle arrangement which is slidable back and forth 69 from the media loading area 18 into printing area 17 responsive to control inputs from a pair of control knobs 58. Critically, as carriage 57 travels inward under assemblies 29, its axial orientation remains fixed so that a target distance between the surface of object 51 and each ink print head is maintained during rotation, which comports with the surface features of object 51 which has an axially symmetric shape. An adjustable tailstock member 59 assists to keep object 51 positioned statically with respect to the object's longitudinal axis by providing an adjustable means to maintain object 51 locked within a single rotating axis while clamped in the slidable spindle arrangement.

Once locked with clamping fixtures 52a,b, carriage 57 is moved into interior printing area 17 and underneath print head assemblies 29. Carriage 57 is further adapted to be slidable in a precise and controlled manner along the object's longitudinal axis along path 68 once repositioned in printing area 17. Printer head banks 29 are held fixed in relation to object 51 with a head manipulator mount 65 supported by upper and lower frame rails 11a,b. Mount 65 includes a pair of end members 66a,b slidable supported by railing 1 1b. A head manipulator alignment adjuster 67 permits fine adjustment of mount 65 by rotating screws 67a,b. The combination of the carriage 57 and supporting rails and brackets described allows for a relatively precise starting position for calibration of the print assemblies 29 relative to objects 51 placed within printing area 17 prior to controlled movement of the individual print head assemblies as will be described.

Below object 51 positioned in movement path 68 are positioned an ink curing assembly 60 holding a serial bank of curing lamps 63 located below object 51 so that light emitted by lamps 63 blanket the surface of object 51 during rotation with ultraviolet radiation (UV). This causes inks being applied via print head assemblies 29 to cure during a fraction of a rotation of object 51. Assembly 60 includes a plurality of curing lamp assemblies 62 each holding a stepper motor 64 that allows for fine adjustment of curing lamp height relative to object 51 as it moves along path 68 during rotation. As shown, bracket 61a supports lamp assemblies 62 which is slidably supported by two pairs of frame rails 61b,c.

Figure 7B:
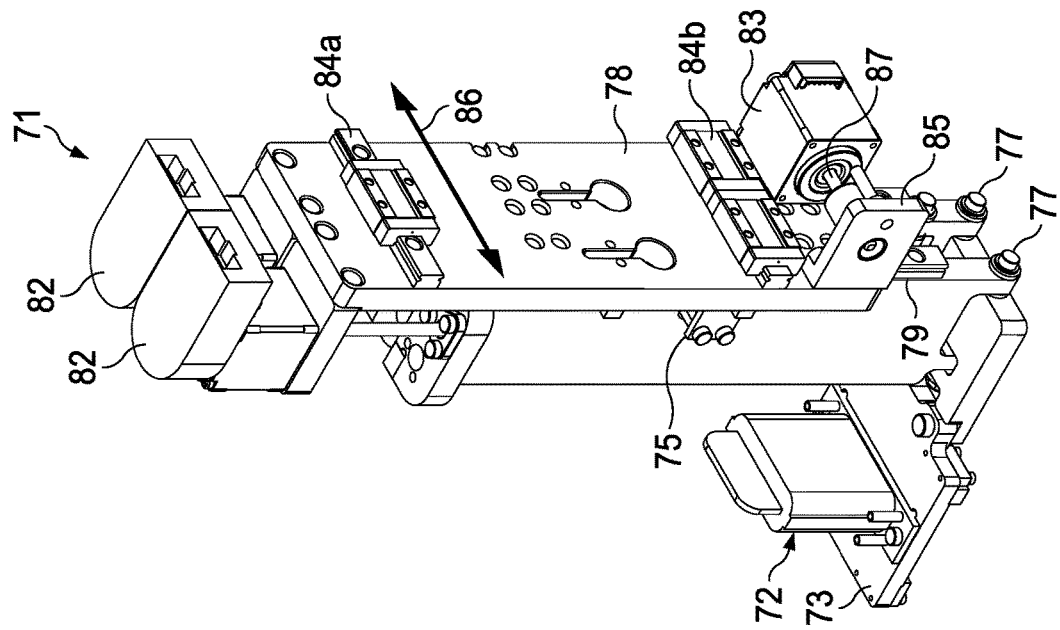
FIGS. 7A-7B show front and back perspective views of the head manipulators for the printing system.
Figure 7A:
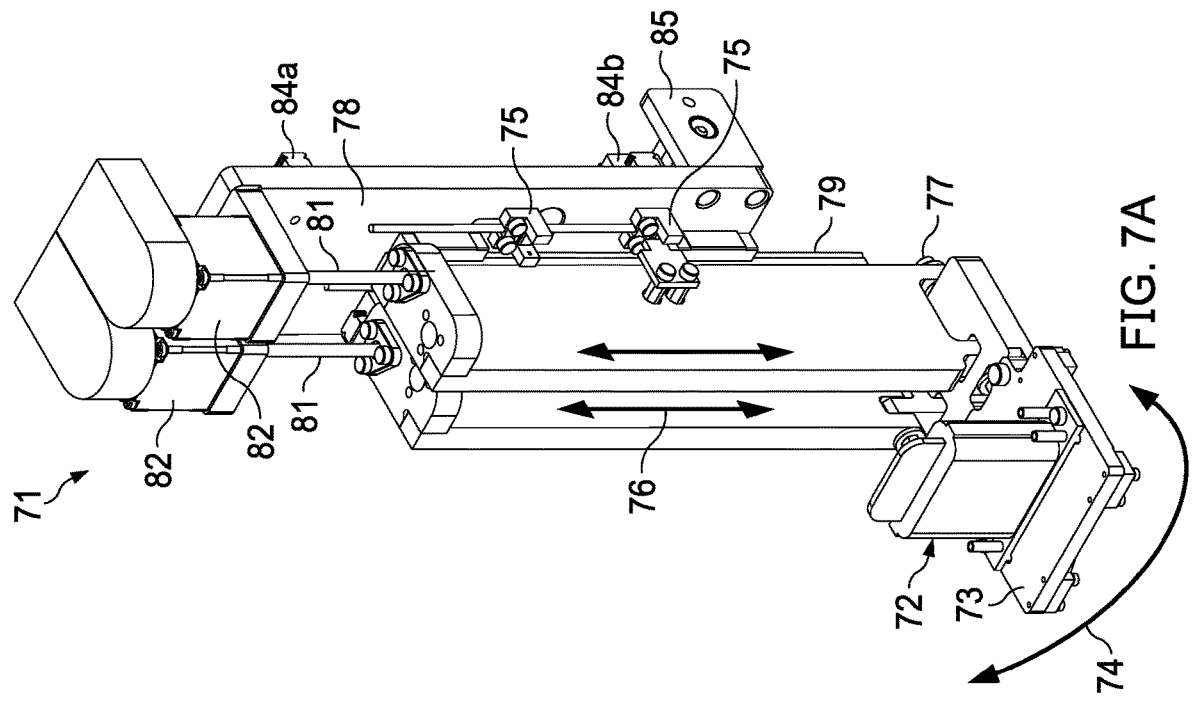

Referring now to FIGS. 7A-7B it may be seen the arrangement of elements in each print head manipulator assemblies 71 held by ink head assembly bank 29. Each head manipulator 71 is supported by mount 65 in slidable relation via horizontal rails 84a,b. A pair of stepper motors 82 are held by back plate 78 at the upper most part of plate 78 and oriented so that their output shafts 81 extend downward along the outer surface of plate 78. Shafts 81 are rigidly bolted to the tops of columns 76 supported by a pair of vertical rails 79 slidably bolted to the outer surface of plate 78 via fixtures 75. At the bottom of columns 76 a print head support platform 73 is held by a pair of freely rotating screws 77 that act as pivot points to allow the independent movement of columns 76 up and down relative to one another responsive to actions of stepper motors 82. This allows for independent pivoting movement 74 of platform 73. Each platform 73 holds a print head 72 from which ink may be deposited on the surface of object 51 just below platform 73, and due to the pivoting movement of platform 73 print head 72 is also caused to pivot about surface of object 51 responsive to actions of stepper motors 82.

Importantly, entire backplate 78 is movable horizontally along path 86 due to it being slidably supported by horizontal rails 84a,b. A stepper actuator 83 is attached to and supported by head manipulator mount 65 and connected via a shaft 87 to side bracket 85 which is fixed to one side of the rear surface of back plate 78. Since horizontal rails 84a,b slidably support backplate 78 to mount 65 (see FIG. 6), movement of shaft 87 by actuator 83 allows for precise horizontal movement of head manipulator 71 along path 86 responsive to electronic impulses issued by electronics held by bay 26 and driver control boards 34.

Figure 8:
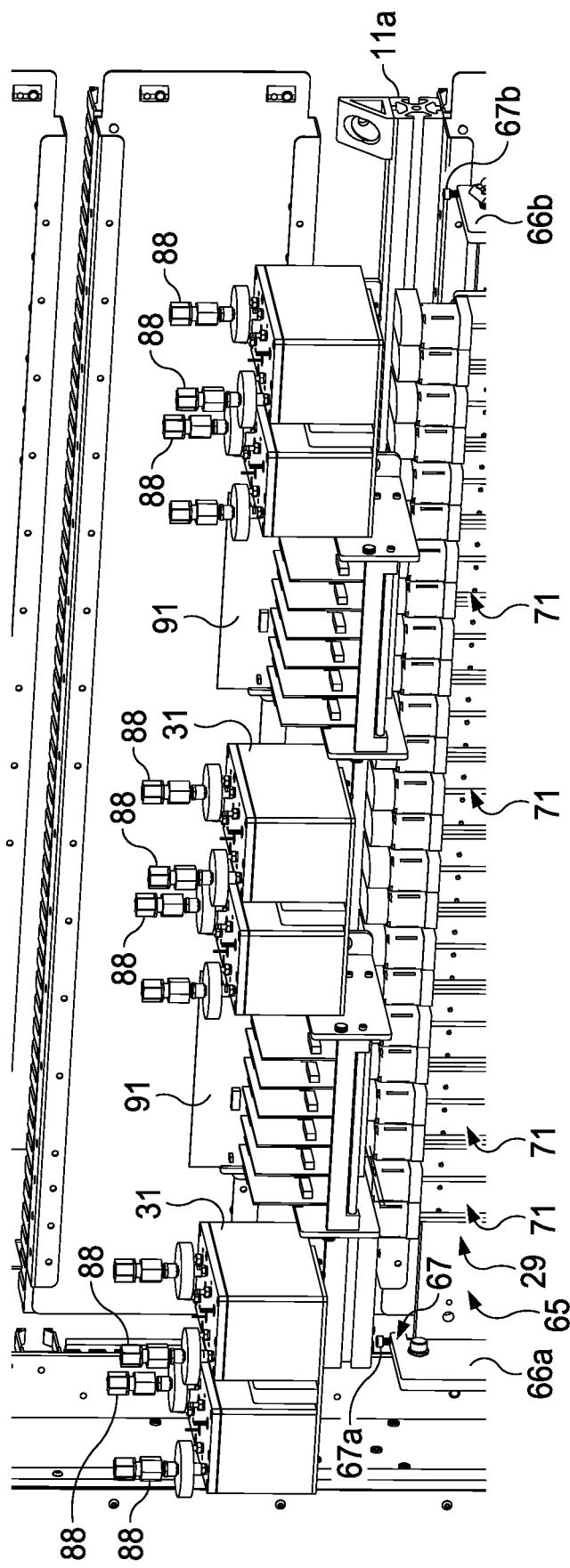
FIG. 8 is an enlarged perspective view of the top portion of the printing area for the printing system.
Figure 9:
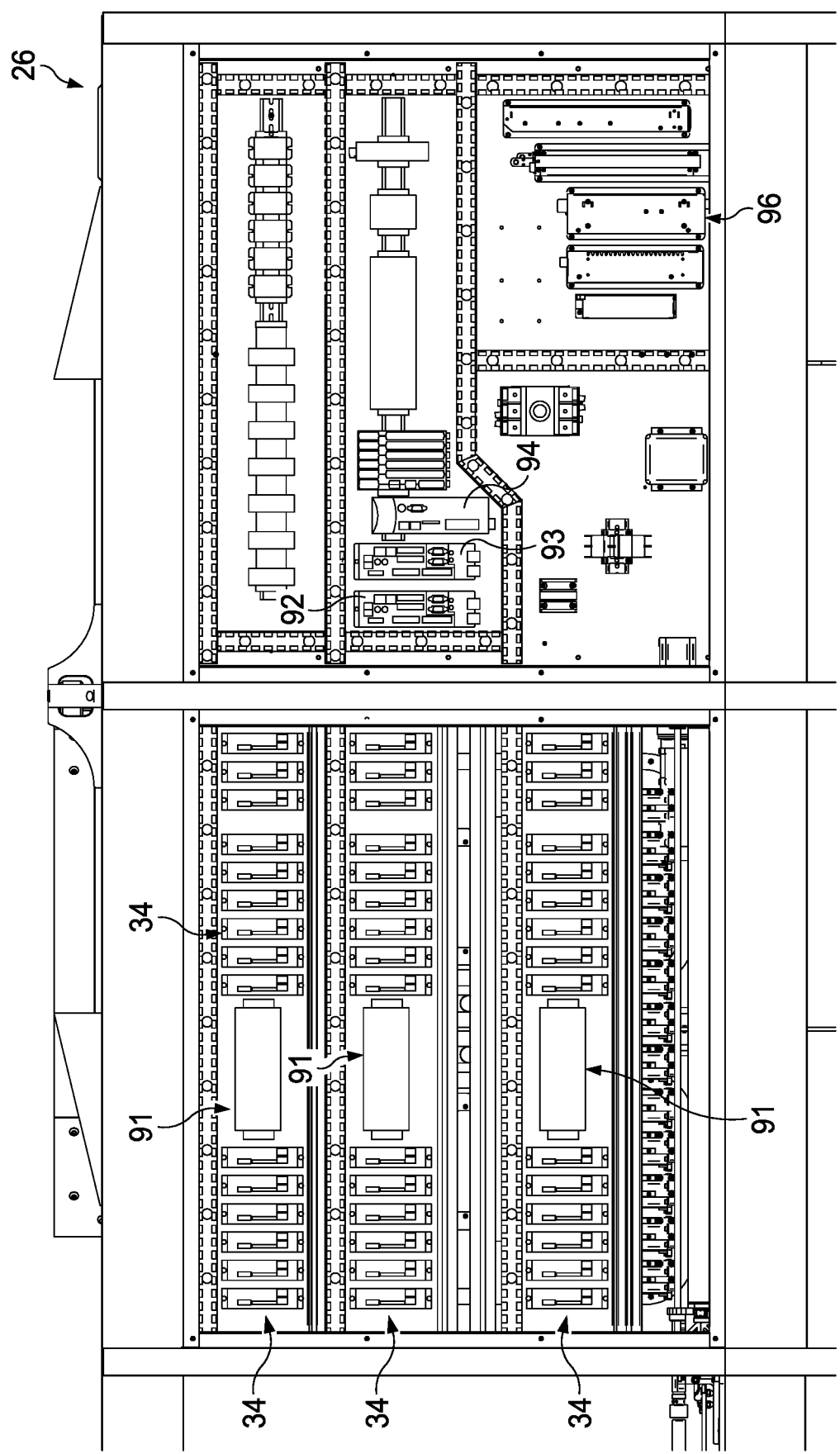
FIG. 9 is a rear elevational view of the left side of the printing system showing internal electrical components in an electrical bay.

Referring to FIGS. 8-9, above ink head assemblies 29 is positioned 6 dual well ink reservoirs or tanks 31 holding various ink colors as required for each imaging job and connected via tubes (not shown) to each ink print head 72 through fittings 88. A series of driver boards 34 are positioned adjacent to tanks 31 and together with carriage control boards 91 control movement of media object 51 and print heads 72 during printing. A suitable driver board for drivers 34 is the A-CSD series of stepper motor drives (Part No. CSD ET 94) offered by R.T.A. Motion Control Systems located in MARCIGNAGO (PV), Italy.

From the rear side of machine 10 driver boards 34 and carriage control boards 91 are positioned to the left of electronics bay 26. Bay 26 includes additional PCBs to control movement during printing such as, a rotary servo drive board 92 to control rotary servo 53, a linear axis servo drive board 93 to control horizontal movement of head assemblies 71 and an EtherCAT controller board 94 to control communications between each driver board from a machine operating system. A power supply rack 96 provides power to the electronics for machine 10 and is positioned to allow for air below the machine to be passed over components 96 and out of exhaust port 24 in top panel 21.

Figure 10:
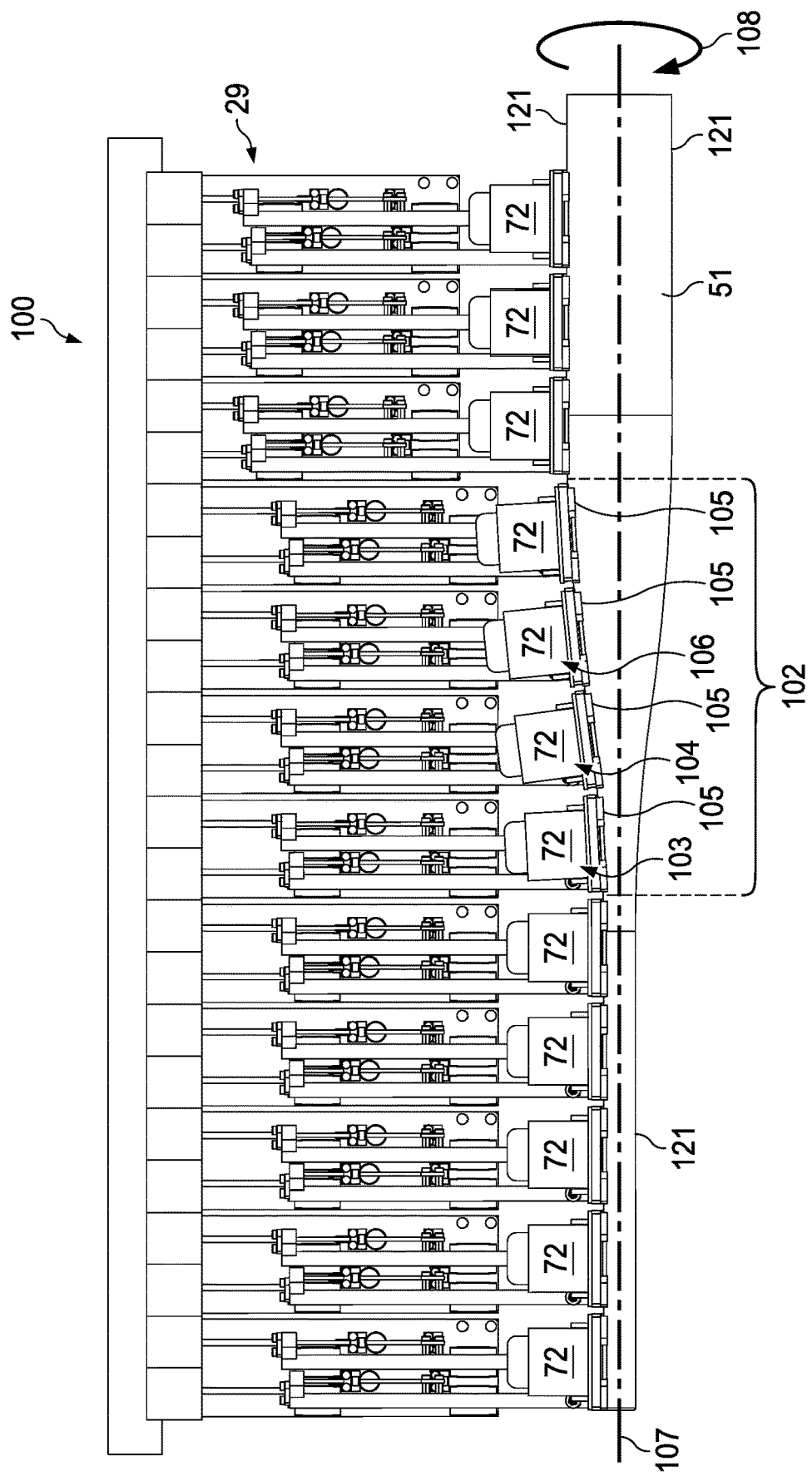
FIG. 10 is a detail view of a bank of ink head assemblies positioned along a contoured surface of a media object being printed.
Figure 11:
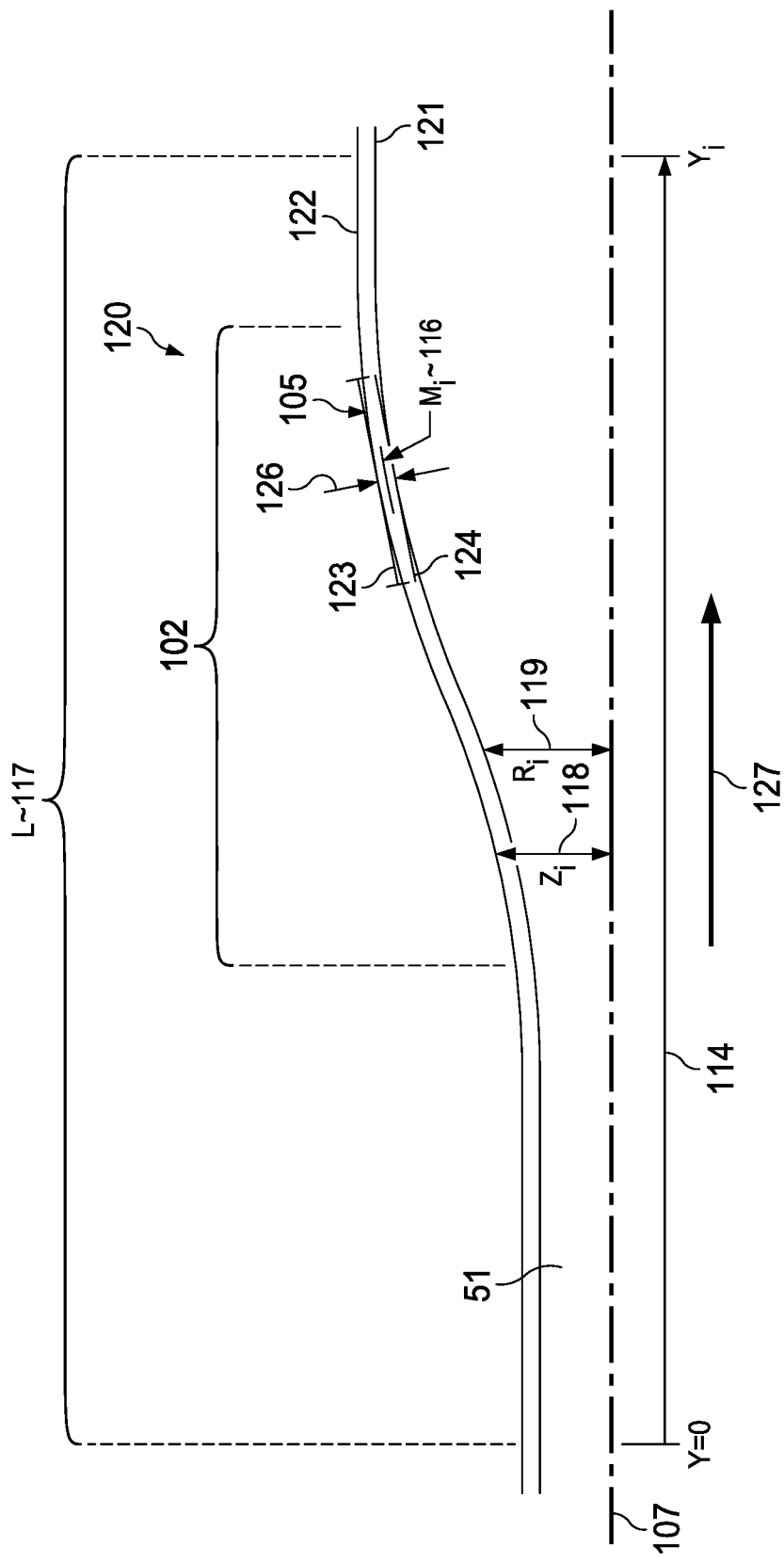
FIG. 11 is a diagram showing the print head movement relative to the media object movement while being imaged.

Referring now to FIGS. 10 and 11, it may be seen the manner and movement 100 of ink heads 72 to conform to the surface of media object 51 as it rotates 108 within printing area 17. As shown media object 51 includes an axially symmetric surface area that varies by radius $R_t$ 119 from central axis 107 of object 51, thereby creating a print path 122 having a print length of L 117 along the curve which is parallel to target media surface 121, but spaced away from surface 121 by a small amount representing the space or "offset" 126 between an ink print head 72 lower surface 105 and object surface 121. This distance is small, typically 0.80 mm to 1.0 mm, and is the distance that ink droplets must traverse prior to landing on object surface 121 to create an image. A contoured media object having an axially symmetrical surface will present a contoured surface portion 102 to the extent that $R_i$ 119 varies from axis 107, thereby creating a fixed local slope $M_i$ 116 along lower surface 105 for the width 123 of each print head that varies as each print head 72 traverses along media surface 121 in print head path 122. As print head bank 29 adjusts to the surface 121 of media 51 within a contour 102, a plurality of ink heads, for example 103, 104, and 106, alter their angle by pivoting around pivot path 74 (see FIG. 7A) to match the slope $M_i$ at each $R_i$ along surface 121 so that offset 126 is minimized. During rotation 108 of object 51, for each $R_i$ along surface 121 ink head lower surface 105 is positioned a corresponding distance $Z_i$ from axis 107.

Any image to be printed is rotated into a portrait orientation with a y-axis value assigned to its height and an x-axis value assigned to its width. These x and y values become the dimensions X and Y, where Y is along the height and Y wraps around the media. As may be understood, for each $Y_i$ there is a corresponding radius $R_i$. Depending upon the length of any image to be printed and the length of media surface 121 upon which the image is to be applied, print path 122 has a fixed length L 117 that object 51 must be moved using carriage 57 along path 68 (see FIG. 6) and having a precise location $Y_i$ 114 along axis 107. A series of equations is shown below that prescribes the slope or angle into which each print head 72 must move in order to suitably conform to a predetermined print path 122 at each $Y_i$ position 114 with its corresponding radius $R_i$. Such a print path may also be referred to as a "motion path."

Given the following variables, a motion path may be calculated:

$$Vl_i = V_{carriage} + dVl_i$$

$dVl_i$=path length mm/1 mm horizontal travel*$V_{carriage}$ mm/s $$dVl_i = (\sqrt{(R_{i+1}-R_i)^2+(Y_{i+1}-Y_i)^2}-(Y_{i+1}-Y_i)) \times Vcarriage$$

A localized slope may be calculated:

$$M_i = \frac{dRi}{dYi} = \frac{R(i+1)-Ri}{Y(i+1)-Yi}$$

The position of the printhead midpoint is defined as:

$$Zl_i = R_i + (\text{Offset})\cos(\arctan(M_i))$$

Approximation of print path length difference from $Y_{total}$:

$$l_i = \Sigma_{i=0}{}^n dl_i = \Sigma_{i=0}{}^n (\sqrt{(R_{i+1}-R_i)^2+(Y_{i+1}-Y_i)^2}-(Y_{i+1}-Y_i))$$

The relative position "Y" of print head to carriage position is:

$$U_i = l_i + (\text{Offset})\sin(\arctan(M_i))$$

This control strategy holds to within 10% accuracy for contour angles up to 25 degrees, but steeper angles require smaller steps, or a three-point path length approximation that assesses the impact of $Y_{i-1}, Y_i, Y_{i+1}$ on arc thru $R_{i-1}, R_i$ & $R_{i+1}$. It will be noted that based on the ratio of the print surface slope to the head slope, image quality degradation can be predicted and a determination made as to whether printed image quality will be acceptable for an object's particular contour characteristics.

In addition, image quality can be improved by reducing the local print head width through the reduction of nozzles used in each print head. For example, to maintain image quality, an imaging objective is to limit ink jet drop-on-drop misalignment to less than ¼ of a drop. The drop size and resolution are chosen such that they blend together between image lines creating full coverage. On contoured surfaces the width of the print head (width 123) represents a chord length along contour profile 102. Approximating the contour as a series of tangent continuous arcs, one can compare the chord length printed on the surface to the length of the contour profile 102 represented by the following formula:

$$s = r*\text{theta}$$

where s=the length of the arc, r=the radius of the arc, and theta represents the swept angle of the arc. The objective is to maintain the difference between arc length s and the print head's print width, (W), to be less than ¼ of the image line spacing, which approximates to:

$$1/(\text{image resolution along arc} \times 4)$$

Where, $$s-W < 0.25/(\text{image resolution along arc})$$

For a given Wand resolution, s−W may be calculated to be:

$$2r(\arcsin)(W/2r) - W$$

As may be seen, by reducing the printed ink width W expressed from a print head results in a decrease in the radius of curvature that may be printed with acceptable image quality. This results in the ability to print over a contoured object with a higher degree of slope (i.e. a tighter curve) without degrading image quality. Hence, using these values the print head width may varied to adjust the image quality to accommodate differing contour properties for various media objects.

Independent of image quality in relation to ink head width, because object 51 is moved at a constant horizontal velocity "V" 127 ink heads 72 must independently move in a horizontal direction independently from carriage 57 motion because each print head along any contour area 102 will encounter a different local slope $M_i$ for its print path at any particular moment along that path. This is accomplished by activating stepper 83 (see FIG. 7B) to move shaft 87 in a bilateral horizontal direction 86 to maintain a constant relative velocity of each print head manipulator 71 along axis 107 as carriage 57 moves along path 68. This movement of ink heads independent of carriage movement holding media object 51 is important to allow for a consistent printed image along contour 102 without distortion.

Because contour 102 presents an increased or decreased $R_i$ depending upon the surface shape of media 51, an image having a fixed width X and height Y uses a predetermined amount of ink for a particular image for an area X×Y, as will be understood. Because $R_i$ varies, in order for an image to be placed on a contoured object surface the amount of ink must also be varied in order to avoid over inking the surface for any $R_i$ that is less than the maximum $R_i$ on the object surface. Hence, a gradient mask must be generated as part of a profile for any imaging job in order to proportionately reduce the amount of ink in response to the degree of contour present on the object 51. This is accomplished by utilizing a third-party illustration software application, such as for example Adobe Illustrator, to create a separate drawing layer for the image artwork to be applied to the media object 51. The separate layer (e.g. called a "knockout" layer) is created as the top most layer using a "process white" that will not actually cause ink to be jetted. It reduces the opacity of all lower levels by its presence. The target reduction is created by applying a gradient opacity to this layer. The gradient starts at 1% of ink removal at the largest diameter and increases per the following equation at each position in the artwork with a corresponding $R_i$ diameter:

Knockout percentage at a given position=(1−(media diameter at position)/(max media diameter))× 100%

These values are saved in the image file that is processed through a raster image processor or "RIP" to create a printer specific file for transfer to the PC controlling the print job prior to execution of the print, as will be further discussed job.

Precise control of motion of several elements in machine 10 allow for the precise application of ink onto the surface of object 51. This is achieved by driver boards sending signals to several actuators in a coordinated manner. The signals sent by those driver boards are controlled by a CAM table, such as a CAM profile function, defined by a set of X and Y coordinates. Those X and Y coordinates are derived from the equations shown above and are unique for each print job. An example CAM table disclosing suitable example variable values is shown in FIGS. 14A-14B, as will be further discussed.

All control signals from driver boards to control motion in machine 10 are initiated from a Windows based O/S software control system run by a PC housed underneath printing area 17, with display screen connected to the Windows OS held by platform 23. Print initiation occurs from signals sent by the PC to motion controller 191 which then controls a series of motion means as part of a motion control subsystem 170 (see FIG. 13) via an EtherCAT communications system 179. Alternatively, they could be supplied by a non-Windows operating system with the proper configuration.

Figure 12:
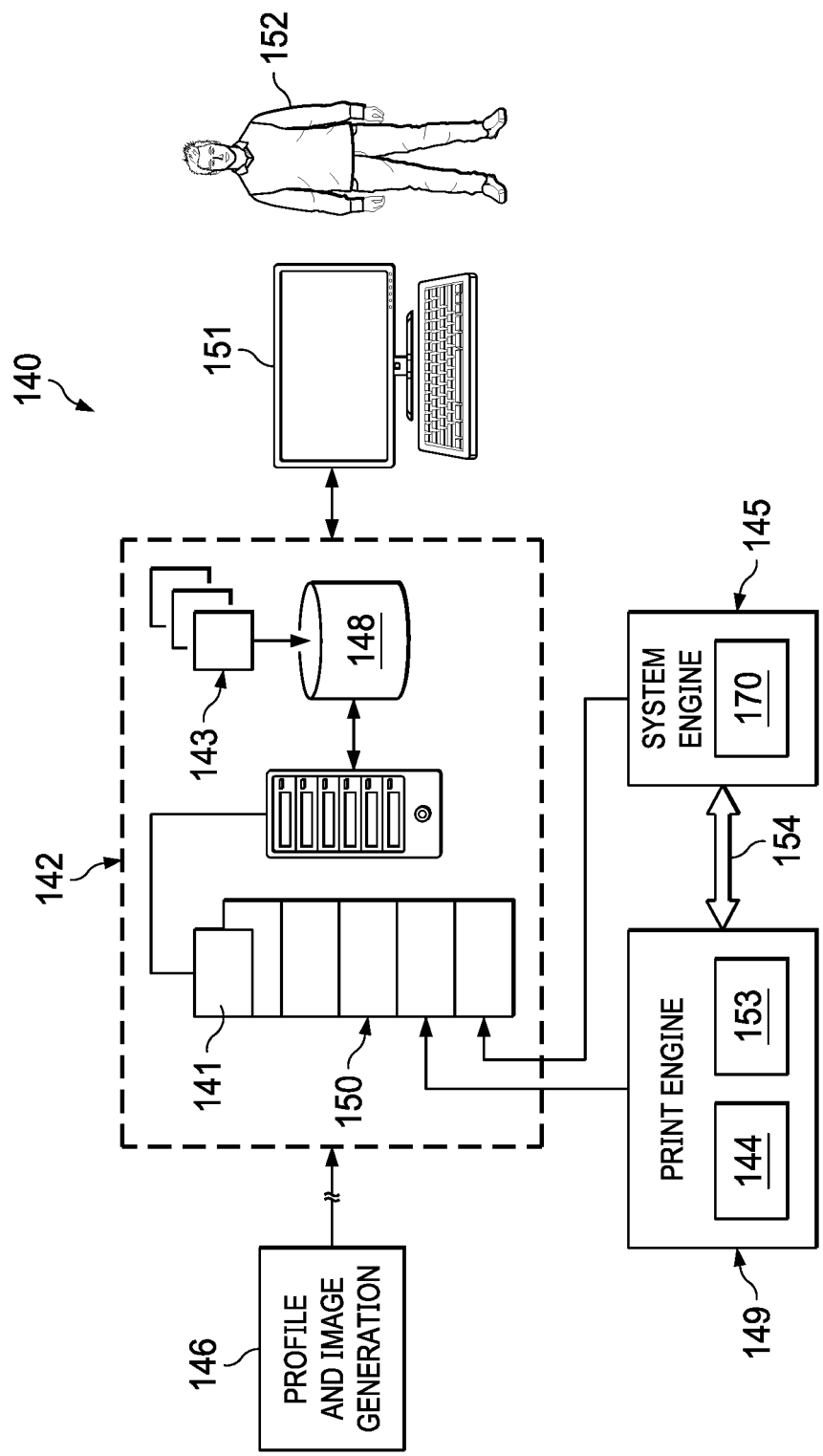
FIG. 12 is a top-level software control diagram showing the relationship between the machine operating system and control signals sent to electronic control systems.

Referring to FIG. 12, a software control system 140 includes Windows OS 141 running on PC 142 having suitable storage 148, display output and user control elements 151, and output communications means as is commonly available in modern PCs. Computer storage 148 holds configuration files and library files 143 (e.g. DLL files) to enable system 140 to utilize loaded files from a print job profile generation process 146 that provides input into system 140 to operate printer system 10 for a print job. Process 146 includes the generating of an image/graphic file for printing onto media 51, and the generation of a geometry file that includes geometric information corresponding to the surface configuration of the media object onto which the image will be applied in the system 10. The image file includes color and ink level reduction values referred to herein as a "gradient mask" for reducing the amount of ink released responsive to surface contour values. The print job profile is held in PC storage 148 as a set of files 143 loaded onto PC and utilized by HMI applications loaded in memory 150. A keyboard and display 151 allow for the generation of a human machine interface (HMI) for an operator 152 to initiate and monitor a print job and for the loading of media onto the machine through loading area 18. As mentioned above, the LSINC HMI overlays the INX HMI and replicates and extends the capabilities of the INX HMI and the LSINC HMI is the interface that a human operator 152 utilizes.

As previously indicated, each print job comprises a specific "recipe" for each media object to be printed that includes the geometry of the surface of the object and an image to be applied to the exterior surface of the object. The herein described recipe is specific for system 10 and holds information not usable by prior printing systems. In practice, a graphic artist would create or obtain an image in a raster file format (i.e. a bitmap image), such as a jpeg, tiff, or png (portable network graphics) formats that they desire to be printed on the media object 51. That image is then converted into a vector-based image through the use of an illustration software application, such as for example Adobe Illustrator. The above-mentioned "gradient mask" is created using this illustration application as well as creating a vector output file, such as an Adobe Postscript file, that may be utilized by a raster image processor ("RIP") for actually printing the final image. The output from Adobe Illustrator may also produce a vector-based pdf (portable document format) file which is an acceptable format for a RIP to utilize. As is known, a raster image processor produces a raster image for output to printing hardware, such as inkjet printing hardware, that produces the image on print media. A RIP is preferred to control the printing hardware because a high-level page description language, such as in a pdf file format, may be utilized where specific image control may be obtained over the final printed image, such as printing resolutions, ink limits, and color calibrations. One acceptable RIP software application is ONYX RIP available from Onyx Graphics, Inc. located in Salt Lake City, Utah. The print file created by ONYX RIP is an .isi file type that separates color planes. This .isi file is supplied directly to the INX supplied print engine 149 for printing.

Print engine subsystem 149 is comprised of a software and hardware component. The software component, principally characterized by the INX HMI, resides on the PC and breaks up the received .isi file into print swaths which are transferred via a USB connection to the head drive controller 191 (see FIG. 13). The head drive controller 191 then communicates the color data to the respective head drives to cause the print heads to print at an appropriate position and timing to print an image on the media. The timing of the firing and motion is synchronized through an encoder signal 172 (see FIG. 13) with the firing slaved to the encoder signal generated by motion control subsystem 170 (see FIG. 13). Further discussions regarding the timing, color control, and printing head actuation of print heads 72 in system 10 shall be omitted in as much as such printing methodologies are standard, purchasable items and well understood for digital printing in the printing industry and not necessary for a complete understanding of the herein described invention.

In addition to the .isi print file, a set of geometry values representative of the media object 51 are loaded onto the print system PC 142 and saved on PC storage system 148 as part of two files 143 necessary for each print job for each type of media object 51 to be printed upon. That geometry file is a simple comma separated variable listing representative of measurements of the media object 51, such as a radius value from the asymmetrical radial axis to the surface of the media along its length, the overall length of the media, the maximum width of the media, etc. The geometries may be generated in various known ways, such as for example a human operator taking physical measurements of the media, a scanning program scanning the media and generating geometries of the media, or a CAD program generating those geometric values. The LSINC HMI reads the media geometry file stored as a .lsg file and creates a CAM table (see FIGS. 14A-14B) for controlling the movement of the inkjet printing heads and for calculating ink pressure adjustment values. That CAM table is translated and sent to a motion controller as a .lcn file over a USB connection. The media geometries file utilized by the LSINC HMI allows it to send commands to the INX HMI through the DLL file during printing to vary ink pressures to compensate for inkjet head movements during printing. Hence, as may be understood, the combination of the image file holding the graduated masking layer and a geometry file constitute a unique recipe for the printing of an image onto the surface of the media object 51. That recipe information is held by the PC 143 in its storage 148 and the combination of the LSINC HMI and the INX HMI utilize that recipe to execute each print job.

Print engine 149 includes an ink delivery system 144 that controls monitoring of ink levels in various containers in machine 10, pressure within ink tubes for consistent delivery of ink from tank to tank, and pressure delivered to the individual print heads. Engine 149 controls the drivers 153 for each print head and appropriate print head nozzle firing responsive to the requirements of each print job. Engine 149 also controls the generation of color ink signals to each print head to express each image color at the appropriate position on the media object surface as it rotates and moves laterally past the print heads.

System engine 145 provides top level system control of motion subsystem 170 (see FIG. 13) which controls the motion of the media held by its carriage, and all elements for printing and curing an image printed onto the surface of media 51 loaded into machine 10. The PC 142 controls the LSINC HMI communicating the status and available commands to human operator 152, runs the software portion of the print engine, and displays the HMI via display and keyboard arrangement 151 for interaction and for command inputs, and other data, to be sent to the hardware portion of the print engine 149.

Figure 13:
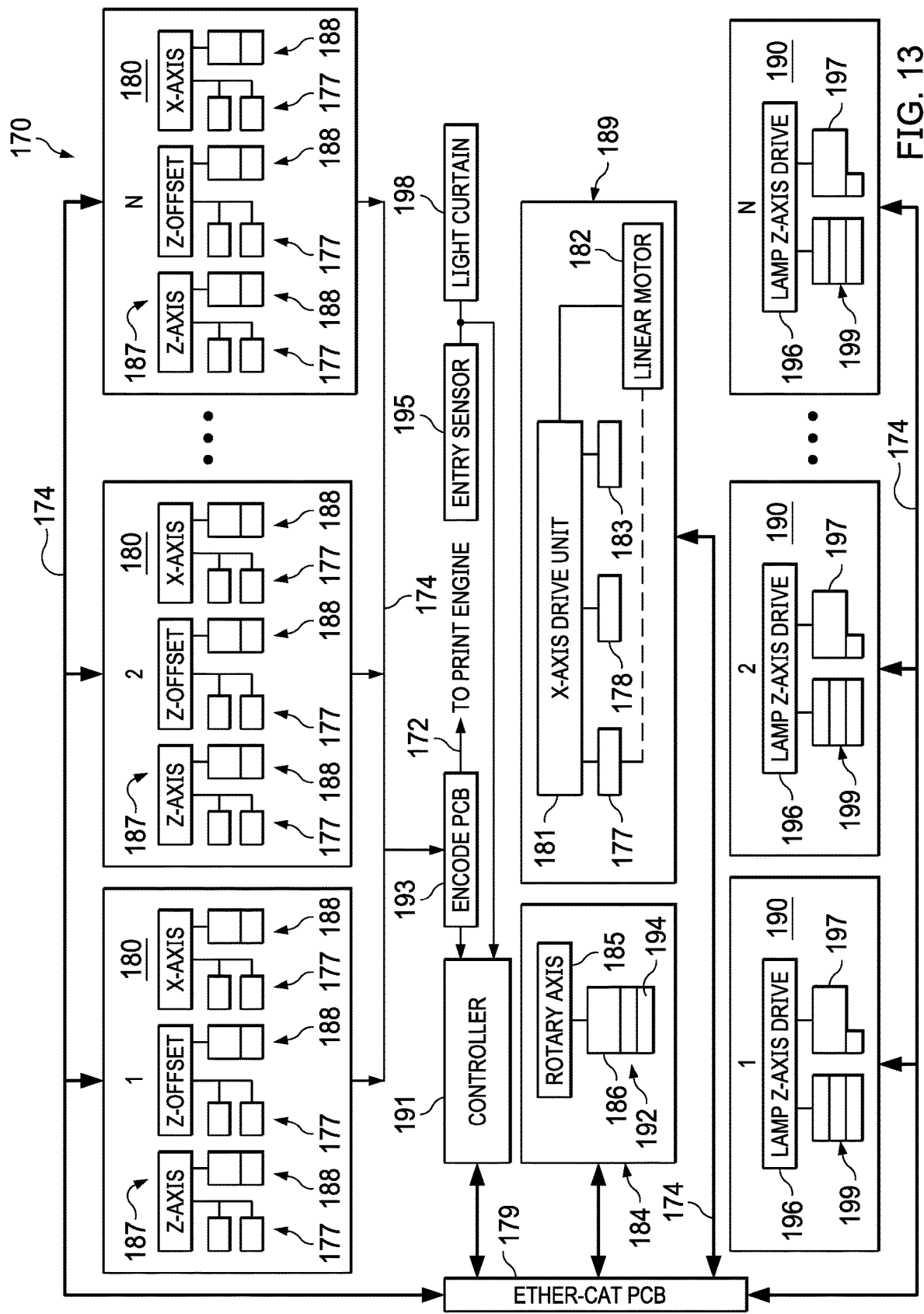
FIG. 13 is a function diagram showing the flow of control signals between various elements of the motion control subsystem of the printing system; and, FIGS. 14A-14B are an example CAM profile table based on a print job profile.

Referring now to FIG. 13, it may be seen a function diagram showing the flow of control signals between various elements of the motion control subsystem 170 of the printing system 10. Subsystem 170 includes a collection of encoders functionally connected to a collection of movement means (e.g. 188, 186, 182, and 197), sensors (e.g. 177, 199), and controllers or "drives" (e.g. 187). The elements shown in FIG. 13 are functionally depicted, but are also generally shown for illustration purposes in their spatial position relative to one another. As is known, each drive may be implemented as a separate PCB and include its own development tool kit that enables controller code to be created and stored in non-volatile memory of each drive board during system operation. The use of an EtherCAT compatible drive presents motor and drive as a servo axis that can be managed via standard EtherCAT protocol. Movement means consist of either DC stepper motors or synchronous servo motors, and are driven by dedicated driver boards controlled by controller 191. Communication between each driver board and controller 191 is accomplished via a plurality of communication cables 174 using standard EtherCAT protocol connected via EtherCAT PCB 179 that allows for an update time of at least 2 ms between elements. In the preferred embodiment, 46 axes are maintained simultaneously in the system 170, with a 2 ms response time which is sufficient to achieve an operative system using this number of axes.

Each movement means includes an encoder to ensure continuous feedback as to axis position in the system 170, and to ensure movement compliance within a bounded position set. Each electronic movement subsystem uses sensors and encoders to provide closed-loop feedback as to the position of any axis relative to media object 51.

As shown, print head manipulators 71 includes a series of electronic movement control subsystems 180 having a Z-axis drive, Z-axis offset drive, and an X-axis drive 187, each with their own set of home sensors and limit switch sensors 177, and a linear actuator with encoder 188. Each subsystem 180 is required for each manipulator 71, which in combination together make up a bank of manipulators 29 (see FIG. 2B). In the preferred embodiment, system 170 includes 12 of subsystems 180, one for each print head 72, but print system 10 may work with more or less than 12 print heads depending upon the number of colors required for each print job and the time in which each print job must be completed for manufacturing goals. For example, an increase in print heads would increase the machine's capacity for high volume manufacturing. Hence, system 170 is scalable for a particular machine to meet a particular printing application requirement.

An X-axis movement for object 51 is accomplished with subsystem 189 having a drive unit 181, a linear motor 182 and encoder 183, and home sensor 177 and limit switch 178. An optical encoder 194 (not shown) is positioned adjacent to tail stock spindle 59 to provide position information on media 51 position along path 68 to provide a closed position feedback loop with X-axis drive 181. An entry sensor 192 and light curtain sensor array 198 provide additional feedback to controller 191 for operator and machine safety. Subsystem 189 is connected to controller 191 via EtherCAT communications line 174. Rotary movement of media 51 occurs via rotary axis subsystem 184 having a drive unit 185 on a PCB, a motor 186 and position sensors 192. X-axis subsystem 189 is configured so that linear motor 182 is a slave relative to rotary axis subsystem 184, rotary motor 186, and all print head subsystems 180 are slaves relative to linear motor 182. This slave arrangement facilitates the use of a CAM table (see FIGS. 14A-14B) to control the relative positions of the elements shown in subsystem 170 and allows for a continuously varying ratio of movement elements to achieve satisfactory print head movement to follow object contour surface 121 through sloped areas 102. Prior systems utilize direct gearing arrangements and cannot vary movement of elements in continuously varying ratios, and therefore cannot follow contoured paths even if they were arranged to be capable of physically moving in a 3-dimensional manner to follow those contoured paths at different resolutions Each curing lamp assembly 62 in bank 60 (see FIG. 6) includes an electronic subsystem 190 similar to print head subsystems 180. Each subsystem 190 includes a drive unit 196, an actuator 197 with encoder, and four sensors (home, limit, front, and rear) 199. Lamp subsystems 190 are connected to controller via EtherCAT cable 174 as shown. Bank 60 preferably includes 7 subsystems 190, one for each UV lamp, but as with the print heads are scalably arranged to accommodate less or more lamps than 7, depending upon the machine operational requirements.

Through cable 174 and EtherCAT control board 179, motion controller 191 commands the individual drives through the EtherCAT protocol to control each movement means, thereby providing coordinated movement of all elements in subsystem 170. For system level movement coordination, an encoder PCB 193 ties timing signals between print engine 149, ink delivery system 144, and motion control subsystem 170 via cable 172. An optical encoder 194 residing on the rotary axis 185 provides timing fire pulses to encoder PCB 193 which distributes the same signal to the motion control system 170 via cable 174. Rotary axis PCB 192 conditions the signal and simultaneously passes it to the head drive controllers of print engine 149. This allows for the system 10 to communicate the X position of media 51 as it travels along path 68 within print area 17.

Satisfactory off-the-shelf components for sub-system 170 shown in FIG. 13 are listed in Table 1.0 below:

TABLE 1

| FIG. 13 Element No. | Element Name | Mfg./Part No. | Description |
| --- | --- | --- | --- |
| 182 | X-axis Linear Motor | Parker Automation/406T14LXRMP | Linear Motor |
| 181 | X-axis Linear Drive | Kollmorgen/ AKD-P00:306-NBEC-0000 | Drive Unit |
| 183 | X-axis Linear Encoder | Integrated with Linear Motor | Integrated Encoder with home and limit switch in motor |
| 186 | Rotary Axis Motor | Kollmorgen/ PN: AKM23D-EFGNC-OO | Motor |
| 185 | Rotary Axis Drive | Kollmorgen/PN: AKD-P00306-NBEC-OOOO | Drive Unit |
| 192 | Rotary Axis Encoder | Renishaw/PN: T10100A-40E | |
| 191 | Motion Controller | Trio Motion Technology LLC/ PN: PB62 & P914 P862 + PB78 + 5x P914 | Quad Core uP w/ support up to 64 Remote Axes |
| 187 and 197 | Linear Actuator (head & lamp manipulators) | Thomson/PN: MLUA051S 1B-0100-03000SFSS-001 | with 4k ppr differential encoder (use "FAS for x-axis, w/anti-backlash nut, 1.3 inch lead, no encoder) |
| 188 and 196 | Linear Actuator Drive (head and lamp manipulators) | RTA/PN: CST ET Model 94 | Drive Unit |
| 177 | Limit sensor for home position & end of travel position (head & lamp manipulators) | Panasonic/PM-25/45/65 series u-shaped micro photoelectric sensor | Photo-electric sensor |
| 177 | Head and Lamp Crash Sensors (front and rear)(head and lamp manipulators) | Panasonic/Ex-11B | Sensor |
| 63 | Curing Lamps | Phoseon/Fire Edge FE400 120 × 10AC 385 nm w/rod lens PN: 33607 | Enhanced body style with air filters & glass protector |
| 198 | Safety Light Curtain Sensor | 14 mm resolution, finger protection; <50 ms response time | Dual Zone: operator station location and print area termination |

As indicated above system 10 relies upon an installed ink supply subsystem purchased from Inx International, referred to herein as an "ink delivery system." However, in order for system 10 to print images with consistent ink quality onto media surface 121, delivery of ink through print heads 72 requires modulation of the ink delivery system in order to compensate for motion of print heads 72. In an industry standard print system, ink delivery system 144 provides a static vacuum to a series of ink supply lines from ink reservoirs (not shown) held in cabinets behind panels 13 to a plurality of ink containers 31 positioned proximate to and above ink head assemblies 29. Electronics held in bay 26 control vacuum system assembly 27 to deliver ink from the ink reservoirs to tanks 31, and also to print heads 72 via a system of tubes (not shown). Each tank also has its own pressure line via one of the manifold fittings 88 that forces ink from tank 31 to the print head 72. While standard ink delivery systems use static pressure to delivery ink to print heads, the disclosed system 10 modulates the delivery of ink to each print heads from each tank 31 to compensate for the change in gravitational forces applied against each print head 72 as each head is accelerated and decelerated to conform to surface contour 102. That modulation is achieved by sending pressure value alteration signals to ink delivery system 144 generated by the INX HMI running on the PC via a USB connection. The INX HMI is in turn responsive to the LSINC HMI sending pressure offset values via DLL commands to the INX HMI, which are responsive to derivative values from print head movements 74,76, and 86 (see FIGS. 7A-7B). Those derivative values are known ahead of time and predetermined during the calculations to create the CAM table 200 (see FIGS. 14A-14B). For example, as print head 72 moves down, ink vacuum pressure must increase to compensate for the increased static head pressure due to gravity forces on the ink delivery system and vice versa as the head moves upwards. The motion control system maintains the relative position of the heads from a home position. The optimal pressure settings in mBar are determined at the home position via calibration testing that ensures the heads do not weep ink. Based on the density of each respective ink used, a revised pressure value is calculated in mBar based on its distance from home in millimeters and the ink's specific gravity. The pressure value is calculated using the following formula:

Pressure at position=Pressure at home+(distance traveled from home in millimeters)×(specific gravity of the ink/relationship between mmH20 and mBar of 10.197mBar/mm)

This information is communicated via a USB bus connected to the ink delivery system 144 (e.g. the JetINX's ink delivery system) every 25 ms or less if the values change. If the values do not change then no refresh signal is required.

Referring to FIGS. 14A-14B, it may be seen a CAM table example 200 based on a print job profile 143. CAM table 200 is truncated 224 since the full extent of values is unnecessary for a full understanding of the figure. CAM table 200 includes a series of columnated values 201 that control movements of various servos and actuators shown in motion subsystem 170 and which were calculated based on the formulas used to describe the movement mechanics of FIG. 11. Each row of numbers represents a discrete position and movement condition for all movement means described for motion control subsystem 170 described in FIG. 13 along print path 122. Column A 202 holds values representative of the geometry of the media object 51 as recorded in a CAD program that was used to model the object, and holds the distance from axis 107 for any modeled object in millimeters and is equivalent to $R_i$. Information for Column A may be obtained in various known ways, such as manual measurements taken along the object surface to calculate its diameter along its surface from which $R_i$ may be derived. The object may be scanned and seed values in the CAD program used to calculate the values. Or, the CAD program itself may calculate the values and output a tabulated list of values based on entered user parameters for the CAD software program. The resolution for the values of A are at most ±0.001 mm. Column B 203 holds slope values calculated for the slope along each point recorded from Column A and are readily provided by most CAD programs. Column C includes the rate of change for each slope value from the prior entered slope value. Columns D-G include values pertaining to $Z_i$, such as D 206 offset print head curve values 122, E 208 velocity of the print head in millimeters per second at the corresponding point in Column A, F 211 required print head tilt position 74 (see FIG. 7A) in millimeters, and the corresponding required tilt velocity G 212 millimeters per second. Values held in columns H-J pertain to compensation movements of each manipulator assembly 71 (see FIGS. 7A-7B) such as H 214 the required horizontal shift at each point along the print path in millimeters, the cumulative derivative shift along the curve in the print path I 216, and the a Dx correction offset value in millimeters J 217. The Dx correction offset maintains a constant velocity relative to the target print surface. Column K 219 holds the lamp path value in millimeters along which the path UV lamps traverses relative to axis 107.

CAM table 200 is held in PC storage 148 and motion controller 191 retrieves the values and stores them in its non-volatile memory upon the operator 152 initiating the printing process through the HMI. The print head positions are slaved to the motion of the linear motor 182 (see FIG. 13). The position of each stepper axis is represented as a CAM table driven by the position of the linear motor 182. As may be understood, row values from 1-n 222 comprise the complete movement values required to complete any print job.

In operation, an operator will use a third-party software CAD program to describe and produce table 200, while exporting the graphic file for the design to be printed into a format acceptable for printer ripping. The ripping tool will then generate a printer specific file representing the image to be printed and a gradient mask calculated based on the media object geometries and recorded in a geometry file. The printer specific file (.isi) and geometry files (.lsg) for the media object to be printed are then transferred via a thumb drive or other common transference method to Windows PC 142 along with all necessary support files as required by print engine 149. The object to be printed (i.e. the media object 51) is loaded by the operator 157 onto spindle 52a,b with axis 107 of the object properly aligned with the rotational axis of spindle 52a,b. Using the HMI on the Windows PC display 151, the operator 152 then moves carriage 57 holding the spindle 52a,b and object 51 into the loading area 18. Inks suitable for the object surface print job are preloaded in machine 10 and ready for use as is known. The print job is then initiated and the object 51 spun at a predetermined rotation rate and ink applied onto the object surface at the correct rotational location along print path 122. Carriage 57 holding the object 51 moves along distance $Y_{0-i}$ 114 at a constant velocity 127 as ink is expressed against surface 121 from each print head 72. Responsive to motion control signals issued by controller 191, and as synchronized with print engine 149 via encoder PCB 193, each print head assembly 71 moves print head 72 into position in a spaced and parallel relation to the surface 121 of the object as object 51 is moved along path 122, applying ink at the precise location along the object surface. As is understood, each print head color is overlapped in a coordinated fashion at the same location on the object's surface so that predetermined colors are achieved on the objects surface to create the preloaded image. Individual UV lamps 63 held in curing lamp bank 60 are moved up and down to conform in a spaced relation to object surface 121 underneath rotating object 51 as it progresses along path 122, thereby curing ink applied to the surface of object 51. Once the object has been printed and end of print distance 114 reached, the object is returned to the home position and withdrawn by operator 152 from the loading area 18. The process may then be repeated for further objects to be printed, except that the print job profile generation and file loading steps may be omitted if the object to be printed is the same as the previous object and the image is the same.

While I have shown my invention in one form, it will be obvious to those skilled in the art that it is not so limited but is susceptible of various changes and modifications without departing from the spirit thereof.

Having set forth the nature of the invention, what is claimed is:

1. In conjunction with an ink delivery system capable of drawing ink from a plurality of ink reservoirs and delivering a color image to a plurality of inkjet printing heads to produce a printed image on a media object surface, said ink delivery system controlled by a computer system capable of receiving user control inputs, a direct-to-object printing system capable of printing on the surface of media object having an axially symmetrical, contoured exterior surface, comprising:

a. a print job profile including information to graduate ink amounts to compensate for printing an image on said contoured exterior and object geometries representing the exterior dimensions of said media object, said print job profile adapted for providing information to said computer system;

b. a movable carriage assembly supported by said printing system for holding said media object in rotational relation thereof, wherein said movable carriage is adapted to rotate and convey said media object during rotation laterally along its symmetrical axis within said printing system at a constant velocity;

c. at least one movable ink jet assembly holding an ink jet printing head coupled to said ink delivery system for receiving ink from said reservoirs, said assembly capable of tilting said printing head such that the portion of said ink jet printing head expressing ink maintains a substantially normal nozzle spray orientation to the surface contours of said object as said media object moves laterally past said ink jet printing head continuously for printing thereupon, and wherein said ink jet assembly is further adapted to move said ink jet printing head responsive to the slope of said surface contours along and parallel to said symmetrical axis of said media object such that the relative lateral velocity of said ink jet print head along the contoured surface of said media object remains constant relative to said contoured surface and independent of said lateral movement velocity of said media object as it moves past said inkjet print head; and d. responsive to data held by said print job profile, a motion control system electrically connected to said ink jet assembly for controlling said same.

2. The system as recited in claim 1, wherein said ink jet assembly includes means for moving said print head parallel to said rotational axis of said media object at a speed different than the speed at which said media object is conveyed on said carriage along said rotational axis.

3. The system as recited in claim 2, wherein said printing system includes a plurality of said ink jet assemblies, wherein each said assembly is controllable by said motion control system to move independently of each other in coordinated movement to conform to the surface of said media object as said carriage moves said media object laterally adjacent to said plurality of ink jet assemblies.

4. The system as recited in claim 3, wherein said print job profile includes a CAM table defining movement values for said at least one ink jet assembly.

5. The system as recited in claim 4, wherein said carriage assembly includes an adjustable and rotatable mandrel for holding said media object such that rotation of said mandrel causes said media object to present an axially symmetric, substantially smooth surface towards said at least one ink jet assembly during such rotational movement.

6. The system as recited in claim 1, further including at least one UV lamp assembly positioned adjacent to said media object for the curing of ink printed on said exterior surface.

7. The system as recited in claim 6, wherein said printing system includes a plurality of said ink jet assemblies, wherein each said assembly is controllable by said motion control system to move independently of each other in coordinated movement to conform to the surface of said media object as said carriage moves said media object laterally adjacent to said plurality of ink jet assemblies.

8. The system as recited in claim 7, further comprising a chassis frame supporting said at least one moveable ink jet assembly above said carriage assembly in static relation to said frame, wherein said carriage is adapted to move from a media object loading position to a printing area beneath said ink jet assembly, said frame including a closable exterior for isolating said media object from nearby workers when said media object is moved proximal to said ink jet assembly, and wherein said frame supports a series of panels for enclosing the interior of said printer, and wherein said frame defines a plurality of electronics bays for holding said motion control system and a PC for controlling said printing system.

9. The system as recited in claim 8, further including a movable arm supported by said frame, wherein said arm includes an adjustable platform for supporting an input means for controlling said printer system by a human operator.

10. The system as recited in claim 1, wherein said ink jet assembly includes means for moving said print head parallel to said rotational axis of said media object at a speed different than the speed at which said media object is conveyed on said carriage along said rotational axis, and wherein said printing system includes a plurality of said ink jet assemblies positioned parallel to a lateral movement path of said media object as it traverses for printing, and wherein said printing system includes a plurality of movable UV lamp assemblies positioned adjacent to said media object, and wherein each is adapted to move to follow the contour of the exterior surface of said media object for the curing of ink printed on said exterior surface.

11. In conjunction with an ink delivery system capable of drawing ink from a plurality of ink reservoirs and delivering a color image to a plurality of inkjet printing heads to produce a printed image on a media object surface, said ink delivery system controlled by a computer system capable of receiving user control inputs, a direct-to-object printing method capable of printing on the surface of media object having an axially symmetrical, contoured exterior surface, comprising the steps of:

a. loading an axially symmetrical media object having a contoured exterior surface on a rotatable mandrel;
b. moving said object into proximity to a group of independently movable inkjet printing heads;
c. rotating said media object;
d. during rotation, moving said media object to traverse by said group of inkjet printing heads;
e. as said media object is moving past said group of inkjet printing heads, independently adjusting the space and angle of each said inkjet printing head to conform to a target printing distance spaced from the surface of said media object, wherein the angle of each said printing head is adjusted to conform to the slope of the contour along said surface as said printing heads move past said surface, and responsive to the slope of said contoured surface moving each said print head laterally such that the relative lateral velocity of each said head along the contour surface of said media object remains constant and independent of the movement velocity of said media object as it moves past said group of inkjet print heads; and,
f. as said media object moves past said printing heads, printing an image on the surface of said media object.

12. The method as recited in claim 11, further including the step of curing said printed image with ultraviolet light.

13. The method as recited in claim 12, further including the step of creating a CAM table to direct movement of said inkjet heads.

14. The method as recited in claim 13, wherein said printing step includes the step of all print heads printing simultaneously next to one another along the length of said media object with overlapping print such that a greater portion of the surface of said media object is covered simultaneously during surface rotation thereby reducing printing time.

15. The method as recited in claim 11, further including the step of prior to loading said media object, creating a print job profile holding geometric information representative of said media object to direct movement of said inkjet print heads, and the step of creating a graduated mask applied to an image file to be printed for reducing print ink jet volume responsive to the changing surface shape of said media object.

16. The method as recited in claim 15, further including the step of creating a CAM table to direct movement of said inkjet heads.

17. The method as recited in claim 11, further including the step of moving a group of UV light sources proximate to said surface of said media object during rotation of said media object, wherein each said UV light source is movable from a proximal position to a distal position relative to the rotational axis of said media object such that each UV source follows the contoured surface of said media object as said media object is moved past said ink jet heads.

18. In conjunction with an ink delivery system capable of drawing ink from a plurality of ink reservoirs and delivering a color image to a plurality of inkjet printing heads to produce a printed image on a media object surface, said ink delivery system controlled by a computer system capable of receiving user control inputs, a direct-to-object printing method capable of printing on the surface of media object having an axially symmetrical, contoured exterior surface, comprising the steps of:
   a. loading an axially symmetrical media object having a contoured exterior surface on a rotatable mandrel;
   b. moving said object into proximity to a group of independently movable inkjet printing heads;
   c. rotating said media object;
   d. during rotation, moving said media object to traverse by said group of inkjet printing heads;
   e. as said media object is moving past said group of inkjet printing heads, independently adjusting the space and angle of each said inkjet printing head to conform to a target printing distance spaced from the surface of said media object, wherein the angle of each said printing head is adjusted to conform to the slope of the contour along said surface as said printing heads move past said surface, further including the step of responsive to the slope of said contoured surface moving each said print head laterally such that the relative lateral velocity of each said head along the contour surface of said media object remains constant and independent of the movement velocity of said media object as it moves past said group of inkjet print heads;
   f. as said media object moves past said printing heads, printing an image on the surface of said media object, wherein all said print heads print simultaneously next to one another along the length of said media object with overlapping print such that a greater portion of the surface of said media object is covered simultaneously during surface rotation thereby reducing printing time;
   g. including the step of creating a CAM table to direct movement of said inkjet printing heads; and,
   h. including the step of curing said printed image with ultraviolet light.

19. In conjunction with an ink delivery system capable of drawing ink from a plurality of ink reservoirs and delivering a color image to a plurality of inkjet printing heads to produce a printed image on a media object surface, said ink delivery system controlled by a computer system capable of receiving user control inputs, a direct-to-object printing method capable of printing on the surface of media object having an axially symmetrical, contoured exterior surface, comprising the steps of:
   a. loading an axially symmetrical media object having a contoured exterior surface on a rotatable mandrel;
   b. moving said object into proximity to a group of independently movable inkjet printing heads;
   c. rotating said media object;
   d. during rotation, moving said media object to traverse by said group of inkjet printing heads;
   e. as said media object is moving past said group of inkjet printing heads, independently adjusting the space and angle of each said inkjet printing head to conform to a target printing distance spaced from the surface of said media object, wherein the angle of each said printing head is adjusted to conform to the slope of the contour along said surface as said printing heads move past said surface, and responsive to the slope of said contoured surface moving each said head laterally parallel to the axis of rotation of said media object while printing said image, wherein said lateral movement of each said head is independent of other movements by said inkjet head and wherein said lateral movement maintains a constant relative velocity of each print head along the contour path of said object surface as said media object moves past said group of inkjet heads;
   f. as said media object moves past said printing heads, printing an image on the surface of said media object; and,
   g. further including the step of moving a group of UV light sources proximate to said surface of said media object during rotation of said media object, wherein each said UV light source is movable from a proximal position to a distal position relative to the rotational axis of said media object such that each UV source follows the contoured surface of said media object as said media object is moved past said ink jet heads.

20. In conjunction with an ink delivery system capable of drawing ink from a plurality of ink reservoirs and delivering a color image to a plurality of inkjet printing heads to produce a printed image on a media object surface, said ink delivery system controlled by a computer system capable of receiving user control inputs, a direct-to-object printing system capable of printing on the surface of media object having an axially symmetrical, contoured exterior surface, comprising:
   a. means for conveying media object geometries representing the exterior dimensions of said media object to said printing system, said geometries means including means for graduating ink amounts to compensate for varying radius values from a rotational axis of said media object while rotating said media object due to its contoured exterior;
   b. means for positioning at least one ink jet printing head coupled to said ink delivery system for receiving ink from said reservoirs, said ink head positioning means capable of moving said printing head in 3-dimensions of space and controllable to continually follow the surface contours of said object in fixed, spaced relation thereof;
   c. means connected to said ink jet positioning means for controlling and causing said ink jet positioning means in 3-dimensions to continuously follow the surface contours of said object simultaneously with the rotation of said object and lateral movement of said object past said at least one ink jet printing head, wherein said at least one ink jet printing head is continuously kept in a proximally spaced relation to said contoured surface;
   d. means supported by said printing system for holding said media object in rotational relation thereof, wherein movement of said ink head positioning means is controlled by said controlling means so that said media object may be conveyed continuously along its rotational axis adjacent to said at least one ink jet positioning means during continuous controllable rotation thereof; and,
   e. a plurality of UV lamps positioned adjacent to said media object surface for curing of ink expressed onto the surface of said media object.

21. A method of printing on the surface of media object having an axially symmetrical, contoured exterior surface, comprising the steps of:

a. loading an axially symmetrical media object having a contoured exterior surface on a rotatable mandrel held by a printer;
b. moving said object into proximity to at least one independently movable inkjet printing head held by said printer;
c. rotating said media object within said printer;
d. during rotation, moving said media object to traverse by said at least one inkjet printing head;
e. as said media object is moving past said at least one inkjet printing head, independently adjusting the space and angle of said at least one inkjet printing head to conform to a target printing distance spaced from the surface of said media object, wherein the angle of said at least one printing head is adjusted to conform to the slope of the contour along said surface as said at least one printing head moves past said surface, and responsive to the slope of said contoured surface moving said at least one print head laterally such that the relative lateral velocity of said at least one print head along the contour surface of said media object remains constant and independent of the movement velocity of said media object as it moves past said at least one inkjet print head; and,
f. as said media object moves past said at least one printing head, printing an image on the surface of said media object.

22. A printing machine for printing on the exterior surface of axially symmetrical, contoured objects, comprising:

a) at least one movable ink jet assembly holding an ink jet printing head capable of expressing ink from a plurality of inkjet spray nozzles;

b) a movable carriage assembly capable of rotating said axially symmetrical object around said object's symmetrical axis and capable of moving said object along the direction of said symmetrical axis laterally and continuously past said at least one ink jet assembly;

c) a motion control system connected to said movable carriage and said ink jet assembly for precise movable control of said same;

d) wherein said at least one ink jet assembly and said movable carriage are adapted through said motion control system for coordinated movement causing said plurality of inkjet spray nozzles to express ink onto said contoured surface of said object continuously over said contoured surface as said object moves continuously past said ink jet printing head, wherein said printing head maintains a constant velocity over said contoured surface independent of the lateral velocity of said object moving past said printing head.

* * * * *